United States Patent [19]
Curtiss et al.

[11] 4,417,194

[45] Nov. 22, 1983

[54] INDUCTION GENERATOR SYSTEM WITH SWITCHED CAPACITOR CONTROL

[75] Inventors: William P. Curtiss, Winthrop; Donald E. Fulton, Stoneham, both of Mass.

[73] Assignee: The Charles Stark Draper Laboratory, Inc., Cambridge, Mass.

[21] Appl. No.: 188,306

[22] Filed: Sep. 18, 1980

[51] Int. Cl.³ .............................................. H02P 9/46
[52] U.S. Cl. ...................................... 322/47; 322/29; 322/95; 290/40 B; 307/84
[58] Field of Search ....................... 322/23, 19, 24, 25, 322/28, 89–96, 32, 47, 29; 323/210; 290/40 B; 307/84, 87

[56] References Cited

U.S. PATENT DOCUMENTS

| | | |
|---|---|---|
| 1,738,344 | 12/1929 | Anderson . |
| 1,931,644 | 10/1933 | Chesnut . |
| 1,940,295 | 12/1933 | Chutter . |
| 2,078,667 | 4/1937 | Kado . |
| 2,243,584 | 5/1941 | Toda . |
| 2,293,484 | 8/1942 | Anderson . |
| 2,298,026 | 10/1942 | Bany . |
| 2,436,302 | 2/1948 | Hyde et al. . |
| 2,451,939 | 10/1948 | Geiselman et al. . |
| 2,460,467 | 2/1949 | Nelson et al. . |
| 2,484,575 | 10/1949 | Livingston . |
| 2,705,301 | 3/1955 | Marbury . |
| 2,871,439 | 1/1959 | Shaw . |
| 2,881,376 | 4/1959 | Shaw . |
| 3,002,146 | 9/1961 | Lorrig et al. . |
| 3,002,147 | 9/1961 | Wasserman . |
| 3,043,115 | 7/1962 | Harter . |
| 3,084,323 | 4/1963 | Sommer et al. . |
| 3,185,811 | 5/1965 | Kasper et al. . |
| 3,375,433 | 3/1968 | Haggerty et al. ..................... 322/32 |
| 3,391,329 | 7/1968 | Meyer . |
| 3,419,792 | 12/1968 | Kasper et al. . |
| 3,530,370 | 9/1970 | Yamachi et al. . |
| 3,675,117 | 7/1972 | Reimers . |
| 3,731,183 | 5/1973 | Johnson et al. . |
| 3,821,456 | 6/1974 | Havas . |
| 3,829,758 | 8/1974 | Studtmann . |
| 3,832,625 | 8/1974 | Gyugyi . |
| 3,855,519 | 12/1974 | Waldmann . |
| 4,037,044 | 7/1977 | Havas . |
| 4,052,648 | 10/1977 | Nola . |
| 4,139,723 | 2/1979 | Havas . |
| 4,162,442 | 7/1979 | Frank . |

FOREIGN PATENT DOCUMENTS

| | | |
|---|---|---|
| 370890 | 3/1932 | United Kingdom . |
| 405234 | 4/1932 | United Kingdom . |
| 657625 | 9/1951 | United Kingdom . |
| 1129420 | 10/1968 | United Kingdom . |
| 1241816 | 8/1971 | United Kingdom . |

OTHER PUBLICATIONS

Brennen, M. B. and Abbondanti, A., "Static Exciters For Induction Generators", IEEE Transactions On Industry Applications, vol. IA-13, No. 5, Sep./Oct. 1977, (pp. 422–428).

Frank, H. and Landstrom, B., "Power Factor Correction With Thyristor-Controlled Capacitors", ASEA Journal, vol. 44, #6, 1971, (pp. 3–7).

Al-Badwaihy, K., El-Bidweihy, E., & Effat, A., "Automatic Power Factor Correction Of Inductive Loads", IEEE, 1979 (pp. 495–502).

*Primary Examiner*—R. J. Hickey
*Attorney, Agent, or Firm*—Lahive & Cockfield

[57] ABSTRACT

An electric power generator system including a switched capacitor controlled induction generator adapted to provide power at a regulated voltage and frequency. The system is adapted for autonomous operation for delivery of power with unity power factor to an external power grid.

58 Claims, 18 Drawing Figures

INDUCTION GENERATOR SYSTEM WITH SWITCHED CAPACITOR CONTROL

BACKGROUND OF THE INVENTION

This invention is in the field of electric power generation, and more particularly, relates to induction generator systems.

Virtually all electric power generators in current use are synchronous machines. Such generators are typically connected together to form an electric power grid. In other cases synchronous generators are operated as autonomous electric power generators. While such synchronous machines do effectively perform in the required electrical power generating applications, those machines are relatively high cost compared with other known generators, such as induction machines adapted for operation in a power generation mode.

However, in spite of the relatively low cost of induction machines, the prior art autonomous induction generator systems have been relatively costly due to the necessary electronics or magnetics required to establish a regulated voltage and frequency. Unlike a synchronous generator, an induction generator operated at fixed voltage and frequency does not allow its real current and reactive currents to independently vary. At fixed voltage and frequency, the real current from an induction generator can vary from zero to maximum with the variation of the slip frequency (i.e. difference between the electrical frequency and mechanical frequency). The reactive current required at fixed voltage and frequency remains lagging and of significant magnitude throughout the generator power range, becoming maximum at the maximum output power. Consequently, an external source of leading reactive current is required to establish an output voltage in an autonomous induction generator. This reactive source must be controllable or variable if the output voltage is to be regulated below saturation of the generator.

The principle disadvantage of the prior art autonomous induction generators has been the high cost of the power electronics and associated magnetics which are required to perform the necessary regulation. In addition, the quality of the output waveform of prior art autonomous induction generator systems has required relatively expensive power filters to meet desired spectral requirements.

The prior art grid-connected induction generators have been infrequently used because of low power factor and current surges during start up. Where an induction generator is to be connected to a power grid, the power grid fixes the induction generator voltage and frequency and acts as a sink for real power and as a source for reactive power. During generator operation, the induction generator shaft is rotated slightly faster than synchronous speed by a mechanical engine, or other primer mover. The resulting negative slip of the induction machine imposes a torque load on the mechanical engine and causes real electrical power to be generated and delivered to the grid. In such induction generators, the reactive current required to maintain the flux of the induction generator is supplied by the grid, resulting in a less than optimum power factor.

U.S. Pat. No. 3,829,758 (Studtmann) illustrates one form of induction generator which uses a voltage mode inverter for exciting an induction generator. A second known form is disclosed by Abbondanti and Brennen in "Static Exciters for Induction Generators", IEEE IAS Transactions, Vol. LA-13, No. 5, September/October 1977. In both of these prior art approaches, a large fixed capacitor is utilized across the output power lines to provide leading reactive current. According to the Studtmann patent, in this form, forced commuted SCR switches reconnect the capacitor from phase to phase such that a nominally constant D.C. voltage appears across the capacitor. In contrast, the Abbondanti and Brennen paper teaches the control of the reactive current by using fixed capacitors on each phase in combination with large controllable or nonlinear inductors which "bleed" or "steal away" the excessive leading reactive current which is not required by the induction machine or load. A switched inductor network is used in conjunction with a network for modulating the length of times which the various inductors are in the circuit. This approach minimizes the number of switches, but the cost of reactances is relatively high.

In alternative prior art configurations, U.S. Pat. Nos. 3,043,115 (Harter) 2,871,439 (Shaw) and 2,881,376 (Shaw) disclose a switched capacitor control for induction machines. However, those systems do not perform voltage regulation but rather permit the induction machine to saturate. There is no voltage regulation which was independent of the machine speed.

It is also known in the prior art to use either a binary capacitor array or an arithmetic capacitor array for controlling the reactive current in an induction generator. Binary capacitor arrays use a switchable sequence of capacitors having binary weighted values (e.g. 1C, 2C, 4C, 8C—) and arithmetic array uses switchable capacitors having the same values (e.g. 1C, 1C, 1C—). With either of these two systems, any integer value of capacitance may be attained by selectively switching in the appropriate ones of the capacitors to reach the desired value. However, for the arithmetic array, a relatively large number of capacitors is required to attain a wide range of capacitance values. In the binary array, a smaller number of capacitors is required, but the exponential nature of the required values for the capacitors requires relatively large capacitances to be used, contributing to system error due to the tolerance values associated with known forms of power capacitors.

Accordingly, it is an object of this invention to provide an improved induction generating system with a controlled reactance network.

Another object is to provide an improved induction generating system that is selectively adaptable for grid-connected or autonomous operation.

Yet another object is to provide an improved induction generating system that is selectively adaptable for grid-connected operation while providing a substantially uity power factor under unbalanced line-to-line or line-to-neutral loads.

Still another object is to provide a power network including two or more parallel connected induction generators.

Another object is to provide an improved power factor correction system with a controlled reactance network.

SUMMARY OF THE INVENTION

Briefly, the present invention is an electrical power generation system comprising an induction machine. In one form of the invention, the induction machine is configured in a generator mode and may be selectively adapted for autonomous operation with controlled reactive excitation provided by an electronically switched capacitor array, or for grid-connected operation with power factor correction using the same switched capacitor array. In the autonomous mode, the system delivers real and reactive power at a regulated voltage and frequency to variable loads, or in the grid-connected mode, delivers real and reactive power to the power grid with a unity power factor at the nominal voltage and frequency of the grid.

The induction generator system in accordance with the present invention includes an n-phase induction machine having a rotatable input shaft and at least n output lines, where n is an integer, e.g. as one or three. In various configurations, the machine may have n differently phased output lines and, in addition, a neutral output line. The input shaft is driven at a controlled frequency by a prime mover. In practice, the prime mover may be, for example, an internal combustion engine in a torque loop, so that the output torque from the engine (as applied to the input shaft of the induction machine) is controlled in response to the detected electrical frequency of the machine.

An N-stage, switched capacitor array provides a controlled reactive current to the output lines of the induction machine. Each stage of the array includes a capacitor network associated with each of the permutations of pairs of the n output lines. The capacitor networks for each stage are characterized by substantially the same capacitance. Each stage further includes an associated switch network associated with each capacitor network for selectively coupling the capacitor network across its associated pair of output lines.

A feedback network is coupled between the output lines and the capacitor array to adaptively control the switching of the various N-stages in and out of operation.

In embodiments of the invention adapted for grid-connected operation, the feedback network includes a power factor detector for producing a signal representative of the power factor at the output lines of the induction machine. The feedback network uses this power factor signal to control the switched capacitor array to adaptively vary that net capacitance across the output lines of the induction generator so that the generator presents a unity power factor to the grid, in spite of unbalanced line-to-line or line-to-neutral local loads coupled to the generator. In one form, the power factor detector generates a power factor signal which corresponds to detected reactive power, and the feedback network is adapted to minimize the reactive power so that the power factor optimized at or near unity. In other forms of the invention, sensed current and voltage signals may be combined to form a power factor signal, which may be optimized to unity. For the purposes of the invention, all of these forms are considered to provide signals representative of the power factor at the output lines. In all of these configurations, the power factor detector may be connected in an "open loop" configuration (which minimizes reactive current drawn by local loads coupled to the induction generator), or in a "closed loop" configuration (which minimizes reactive current drawn by the grid).

In embodiments of the invention adapted for autonomous operation, the feedback network is adapted to control (or regulate) both the voltage and frequency at the output lines of the induction machine. In this case, the feedback network includes a detector which produces one or more signals representative of the amplitude of the voltage at the output lines of the induction machine. This feedback network uses the amplitude signals to control the switched capacitor array to adaptively vary net capacitance across the output lines of the induction generator. With this configuration, if more capacitance is added than is required to balance the lagging reactive power of the autonomous generator and its loads, the generator voltage increases in a ramp fashion. Voltage similarly decreases if less than the required capacitance is switched across the output lines. In steady state operation at the desired operating voltage, the average capacitance added provides leading reactive power to exactly balance the net lagging reactive power of the autonomous system.

In the autonomous mode, frequency is regulated by a feedback loop which compares the output electrical frequency to a reference and uses the resultant error signal to adjust the prime mover (e.g. the throttle of a mechanical engine).

Generally, in the autonomous mode, the feedback network compares the voltage on the output lines of the induction machine against a reference and the samples and holds the resultant error signal. Thereafter, a capacitance proportional to the error is switched across the output lines during the next cycle. For three-phase systems, improved bandwidth and voltage regulation can be achieved by adding the required capacitance once each cycle per phase, resulting in an effective rate of three times per cycle.

In an N-stage switched capacitor array, where at least X of the stages have binary weighted capacitance values from stage to stage, at least $2^x$ different values of capacitance are available for switching across the output lines per phase. Where X of the stages have binary weighted capacitances and the remaining N-X stages have identical capacitances corresponding to the maximum binary value, the number of different capacitance values which may be switched across the output lines per phase is $(N-(X-1)2^{X-1}+2^{X-1}-1)$. With such configurations, each cycle or two, the amount of capacitance across the output lines may be dithered between adjacent values with the appropriate duty cycle, such that on the average, the exact amount of capacitance required is on line. Step size of the reactive current quantization is proportional to the smallest capacitor in the array. The small cycle-to-cycle variation in the capacitor array reactive current caused by the finite number of capacitance steps does not significantly affect the output line voltage since the air gap flux, and thus, the voltage, of the induction machine responds relatively slowly to variations in reactive current excitation. The time constant of the voltage response to a reactive current step is approximately equal to the rotor time constant, which typically is hundreds of milliseconds, or tens of cycles. Thus, the induction machine inherently filters out most of the effect of small dithering excitation current steps caused by the finite capacitor quantization.

In one form of the invention, X of the N-stages of the capacitor array are characterized by binary weighted capacitance values from stage to stage (e.g. 1C, 2C, 4C, 8C,—, where C is a reference capacitance value), and the capacitors of N-X of the N-stages are characterized by substantially equal capacitance values from stage to stage (e.g. 1C', 1C', 1C',—, where C' is a reference capacitance value and typically $C'=2^xC$). With this hybrid binary/arithmetic weighted capacitor configuration, relatively fine gradations of capacitance may be adaptively switched in and out of the network (using the binary weighted portion of the array), while the arithmetic portion of the array contributes relatively large units, when necessary. Thus, the present invention combines the best of the attributes of the binary and arithmetic array configurations in that relatively small quantization errors may be achieved, while no capacitances are required to be so large that tolerance values are a problem. Moreover, a modular expandable system may be provided by just adding another large value capacitor stage, rather than having to re-scale the entire capacitor array as in a straight binary weighted array system.

In another form of the invention, the feedback network includes both a power factor detector and an amplitude detector for the voltages on the output lines of the induction machine. In this form, the feedback network includes a two state controller, or switch, which is switchable to select between these two detectors, in conjunction with a switch which selectively couples the output lines of the induction machine either in or out of an external power grid. When the feedback network is in one state, the induction generator system is coupled to the external power grid, while providing unity power factor at the output lines. In the second state, the generator system is connected for autonomous operation with control of frequency and voltage at the output lines.

In another form of the invention, two or more induction generator systems may be coupled in parallel, where the feedback network for the total system includes a voltage detector coupled between the output lines and the capacitor array so that the system adaptively controls the values of the capacitors switched across the output lines of the combined system.

It is known that an attempt to flux energize an unexcited induction generator from an existing voltage line tends to instantaneously collapse the voltage of that line (e.g. to one half the nominal value where the added generator is identical to the already running generator), causing "blink" or "flicker". In the various forms of the invention adapted for parallel interconnection of induction generators, either in a grid or autonomously, at least one of the induction generators may include a power thermistor network coupled in at least one of its output lines. The thermistor network includes a thermistor device which may be selectively switched in and out of that output line. In operation, the thermistor network acts as a buffer between the output line of the generator to be magnetically excited and the corresponding output line of the excited generator. When a non-excited, but mechanically spinning (near synchronous speed) induction generator is to be coupled in parallel to an already operating induction generator, with the thermistor network coupled in one of the output lines, the thermistor initially provides a relatively high resistance in the output line preventing overload of the system. This initial current to the unexcited but spinning generator causes the build-up of flux (voltage) across that machine. The current is maintained substantially constant (by sizing the thermistor so that it decreases in resistance as it self heats at a rate tracking the voltage build-up). Consequently, the time constant associated with the voltage build-up would be approximately equal to the rotor time constant. In the preferred form of the invention, the current is approximately equal to the steady state magnetizing current which, for single phase excitation of a three phase machine, is approximately three times the "no load" magnetization current drawn by a machine driven from a balanced source. When the initially unexcited induction generator is fully excited, the voltage drop across the then relatively high temperature thermistor is negligible and that device is then switched out of the line by a switch that bypasses the thermistor. With this configuration, magnetic energy is built up in the initially non-excited generator in a controlled manner so that the generator is brought on line without a significant current surge (i.e. in a "blink"-free manner). In alternate embodiments, separate thermistors are used for each phase, requiring one $n^{th}$ the current necessary for exciting the generator.

In yet another form of the invention, the feedback network may include a voltage profiling network for controlling the output voltage at times of relative high loading. For example, when an AC electric motor load is started on line, it creates a substantial real load on the prime mover, causing a reduction in the frequency of rotation of the input shaft of the induction generator (particularly if the prime mover is torque limited). The voltage profiling network detects when such frequency changes occur, and provides an offsetting signal to cause the induction machine to provide a relatively low output line voltage (e.g. 0.707 times the nominal voltage) for a range of frequencies just below the nominal operating frequency. As a result, at times of high load, the output line voltage is reduced, providing less load to the prime mover. As a consequence, the prime mover may continue to operate at its high power level close to the nominal system frequency. The electrical frequency in the feedback loop of the switched capacitors remains relatively high so that the capacitor array can provide the required reactive current (which is also high in a transient range) with a minimum of capacitors. A second benefit of this configuration is that the prime mover can operate at a higher speed than would otherwise be possible and so provide higher power into the induction machine.

In yet another form of the invention, additional leading reactive current can be provided during times of relative high reactive loading (for example, line starting an induction motor) by insertion into part of the capacitor array, A.C. electrolytic capacitors. Normally most of the capacitors in the array are designed for continuous A.C. operation. However, an economical approach to providing additional reactive current for use during intermittent overloads is to include in the array A.C. electrolytic capacitors (sometimes called "motor start capacitors") which are designed for intermittent duty.

In all of the above embodiments, the feedback network may include a switch control for the various capacitor stages of the capacitor array. This switch control network monitors the line-to-line voltages of those lines. Such voltages may include transients (such as produced by rectifier loads) which cross zero. In one form of the invention, the switch control network incorporates a first zero crossing detector coupled to the output lines. This first zero crossing detector is coupled in turn to an integrator which in turn is coupled to a second zero crossing detector. The output from the second zero crossing detector provides a switch control signal which is optimally adapted to switch the capacitors in the array at such times when the capacitors are fully charged to the line voltage, thereby eliminating one source of transient errors on the line.

BRIEF DESCRIPTION OF THE DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENT

Figure 1:
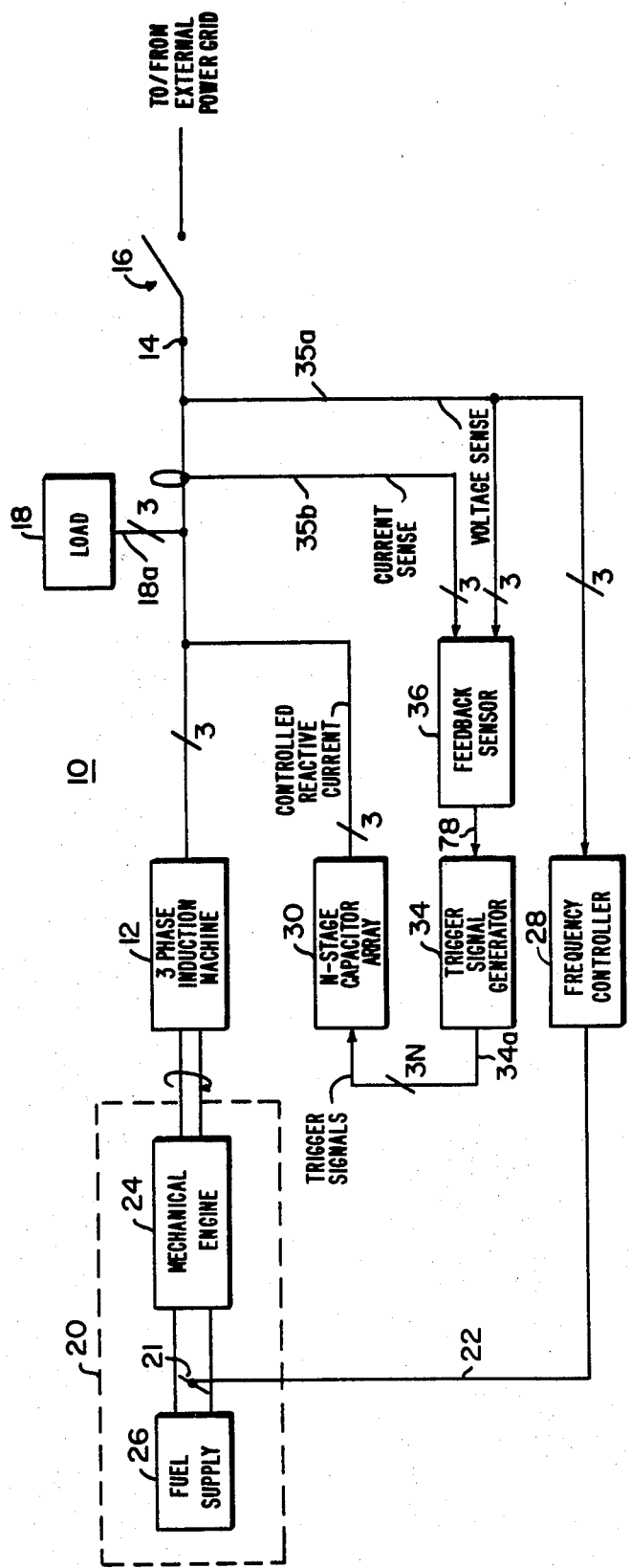
FIG. 1 shows in block diagram form, an induction generator system in accordance with the present invention.

FIG. 1 shows an induction generator system 10 which includes a three phase induction machine 12 having three output lines coupled to an associated set of three output terminals (indicated collectively by reference designation 14). In alternate embodiments, a fourth (or neutral) line may be provided in addition to the three output lines 14. In the present embodiment, the output terminals 14 may be selectively controlled by a switch 16 so that the terminals 14 may be coupled to an external power grid for supplying and receiving real and reactive power from such a grid, or alternatively may be de-coupled from that grid for autonomous operation. A local load is indicated by block 18 coupled to the output lines of the induction machine 12. In other forms of the invention, different phase induction machines (e.g. single phase) may be similarly configured.

A controlled-torque prime mover, or driver, 20 is adapted to drive the input shaft of induction machine 12 at a frequency related to a frequency control signal applied by way of a line 22. In the present embodiment, the prime mover 20 is an internal combustion engine 24. The speed of the engine 24 is controlled by a throttle 21 driven by the signal on line 22. Throttle 21 controls the fuel flow from a fuel supply 26. In alternative embodiments, the prime mover may be a windmill, for example, with its output torque (speed) controlled by varying the pitch of the blades. In yet other forms, the prime mover may be a d.c. motor with its output speed controlled by a conventional motor speed control signal.

The frequency control signal on line 22 is provided by a frequency controller 28 which is coupled back to the output lines from machine 12.

A switched capacitor array 30 is adapted to provide a controlled reactive current to the various output lines of the induction machine 12. Array 30 includes N stages, each including a capacitor network associated with the various permutations of the pairs of the output lines of machine 12. In the present embodiment where machine 12 is three phase, each stage of array 30 includes three identical capacitor networks. Each capacitor network includes one or more capacitors providing a characteristic capacitance value for that stage and has an associated switch network. The capacitance values within each stage are characterized by substantially the same net capacitance. The switch network is responsive to an applied trigger signal for selectively coupling the capacitor networks of that stage across the associated pair of output lines of machine 12.

Thus, in the preferred embodiment, the switched capacitor array 30 includes N stages, where each stage is in the "delta" configuration mode (i.e. each stage includes a capacitor selectively coupled between an associated pair of output lines of machine 12). In an alternate, but equivalent configuration, the array 30 may include N stages, where each stage is in the "wye" configuration (i.e. each stage includes a capacitor selectively coupled between an associated output line of machine 12 and a common potential on a neutral line. The illustrated delta configuration generally permits the use of capacitors with higher voltage ratings, and less capacitance (and correspondingly less expense), than its dual wye configuration.

In the present three-phase embodiment, there are 3N trigger signals (on 3N trigger signal lines 34a) applied to the N-stage array 30 for selectively switching the various capacitors in and out of operation. The trigger signals are provided by trigger signal generator 34, which in turn is driven by a feedback sensor 36. In the presently described embodiment, the feedback sensor 36 is coupled to the output lines from induction machine 12 by way of three voltage sense lines 35a providing signals representative of the voltage on those output lines, and by way of three current sense lines 35b providing signals representative of the current through those output lines. Thus, the system 10 is "closed loop". In alternate forms, the system 10 may be "open loop" and current sense lines 35b may sense current in lines 18a passing to the local load 18. In the configuration of FIG. 1, when the switch 16 couples terminal 14 to an external power grid, the sensor 36 functions in a first state to determine the reactive current at terminals 14. When switch 16 decouples system 10 from the external grid, i.e. for autonomous operation, sensor 36 functions in a second state to determine the amplitude of the voltage on the output lines from machine 12.

Figure 2:
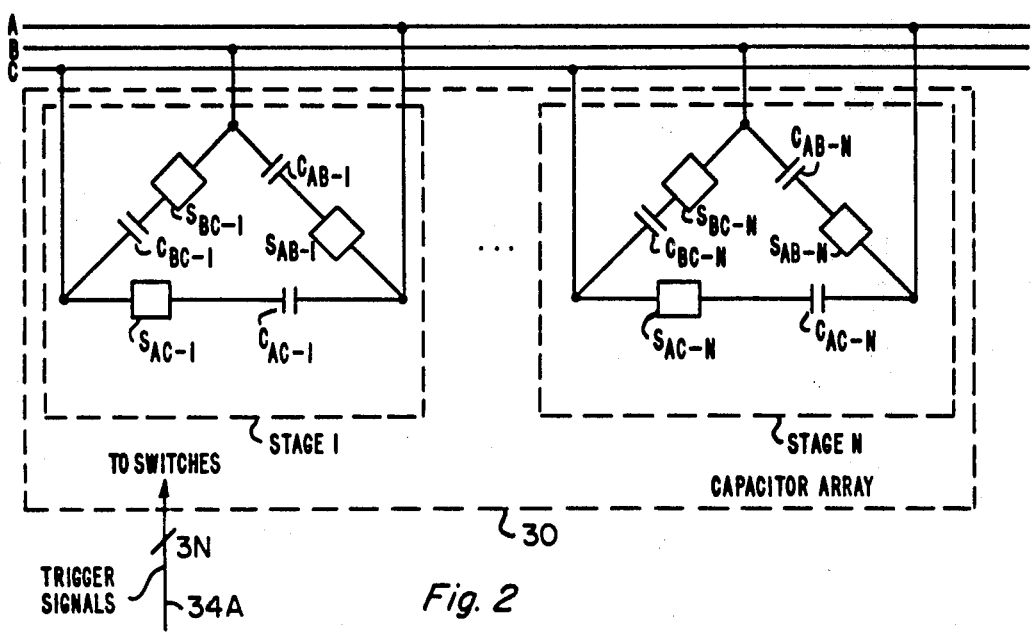
FIG. 2 shows in schematic form, an embodiment of the switched capacitor array of the system of FIG. 1.

FIG. 2 shows the first and $N^{th}$ stages of the capacitor array 30, and the manner in which those stages are coupled to the output lines from induction machine 12. In FIG. 2, the three output lines from machine 12 are denoted A, B and C. The first and $N^{th}$ stages of array 30 are shown schematically to include a capacitor (denoted C with subscripts) and a switch (denoted S with subscripts) coupled between the various pairs of output lines A, B and C. The subscripts for the respective capacitors and switches in FIG. 2 are indicative of the two output lines associated with those elements. In the present embodiment, the first X of the stages of array 30 include capacitors which have binary weighted branch capacitances from stage to stage. The remaining N-X stages have equal value capacitances in the various branches from stage to stage, as indicated in the following Table. FIG. 2 shows 3N trigger signals, each being associated with one of the switch networks in the stages.

TABLE

| BINARY WEIGHT | | ARITHMETIC WEIGHT | |
|---|---|---|---|
| $C_{AB(1)}$ $C_{BC(1)}$ $C_{CA(1)}$ | } C | $C_{AB(X+1)}$ $C_{BC(X+1)}$ $C_{CA(X+1)}$ | } $2^X C$ |
| $C_{AB(2)}$ $C_{BC(2)}$ $C_{CA(2)}$ | } 2C | . . . | |
| . . . | | $C_{AB(N)}$ $C_{BC(N)}$ $C_{CA(N)}$ | } $2^X C$ |
| $C_{AB(X)}$ $C_{BC(X)}$ $C_{CA(X)}$ | } $2^{x-1} C$ | | |

In one form of the invention, shown in FIGS. 1 and 2, the capacitors in array 30 are in the "delta" configuration, where the 3N trigger signals for network array 30 permit independent control of the switching of each delta capacitor in the various stages. In that embodiment, a combination binary-linear weighted capacitor array is utilized which switches stages in or out at one time per cycle at only the positive peaks of the line voltage. In general, switching off-line of the capacitors of the various stages can occur at either positive or negative (zero current) voltage peaks, i.e. within 180 degress of a desired time with corresponding turn-on (at K×360 degrees) from this turn-off point.

Figure 3:
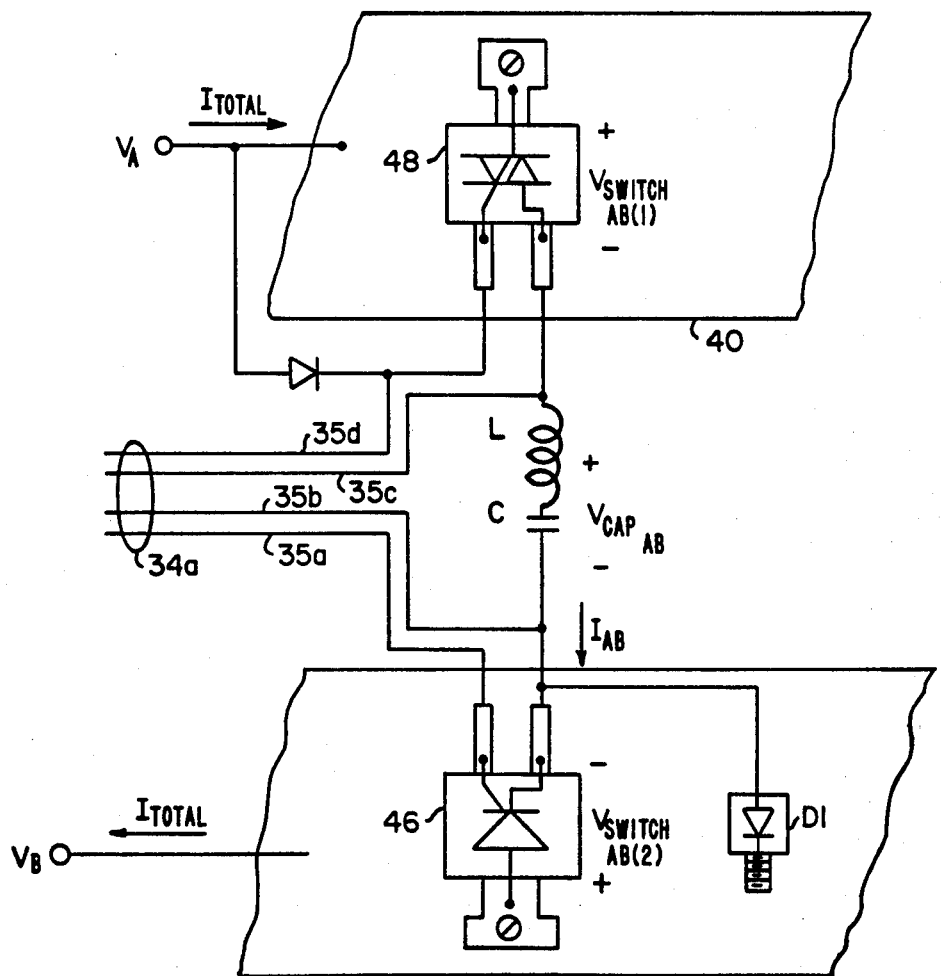
FIG. 3 shows in schematic form, a capacitor network and associated switch network of the array of FIG. 2.

FIG. 3 shows an exemplary form for the first stage line-to-line capacitor and associated switch network for the array 30 between lines A and B on the induction machine 12. In this form, the output lines A and B each provide high current buses for the output current of the various stages. The buses are indicated in FIG. 3 by reference designations 40 and 42. It will be understood that the buses are particularly adapted to provide highly efficient convective heat transfer so that these buses act as heat sinks for the respective components coupled thereto.

The capacitor network is coupled between the bus elements 42 and 40 by semiconductor switches SCR 46 and TRIAC 48, respectively. The capacitor network 50 includes a capacitor (denoted C) in series with an air-core inductor (denoted L). The current through that series capacitor-inductor combination is denoted by $I_{AB}$. In the present embodiment, the capacitors are A.C. capacitors type 520P or metallized polypropylene A.C. capacitors type 325P, manufactured by Sprague.

The capacitor is coupled to the cathode of SCR 46 and the anode of an anti-parallel diode D1. In the present embodiment, SCR 46 has a TO-220AB package having its anode connected in direct thermal and electrical contact with bus element 42. The diode D1 is a stud mounted diode coupled having its cathode in direct thermal and electrical contact with bus element 42. The trigger signal from generator 34 (as defined more fully below) is applied by way of line 34a across the gate-cathode terminals of SCR 46. In FIG. 3, the trigger signal line for the illustrated switch network includes four wires (denoted collectively 34a). The wire 35a running to the gate of SCR 46 has an associated return wire 35b running from the cathode of SCR 46 back to generator 34.

The inductor L is connected directly to the MT1 terminal of TRIAC 48. In the present embodiment, TRIAC 48 has a TO-220AB package having its MT2 terminal connected in direct thermal and electrical contact with the bus element 40. A signal diode 50 has its cathode connected to the gate of TRIAC 48. The anode of diode 50 is connected to the bus 40. The trigger signal from generator 34 for TRIAC 48 is applied by way of line 34a across the gate-MT2 terminals of TRIAC 48. As with SCR 46, a first wire 35c provides the trigger signal to the gate terminal of TRIAC 48, with a return wire 35d running back to generator 34.

With this configuration, the various capacitor networks may be selectively switched three times per machine cycle in a manner so that the "off" or disconnected capacitors remain charged to the peak line-to-line voltage. Current surges are avoided in normal operation by triggering the semiconductor switches (SCR 46 and TRIAC 48) of each phase at the peak line-to-line voltage which occurs at the mid-point between the line-to-line voltage zero crossings. Consequently, there is nominally zero voltage across the semi-conductor switches, and no current surge when those switches are triggered on.

Figure 4:
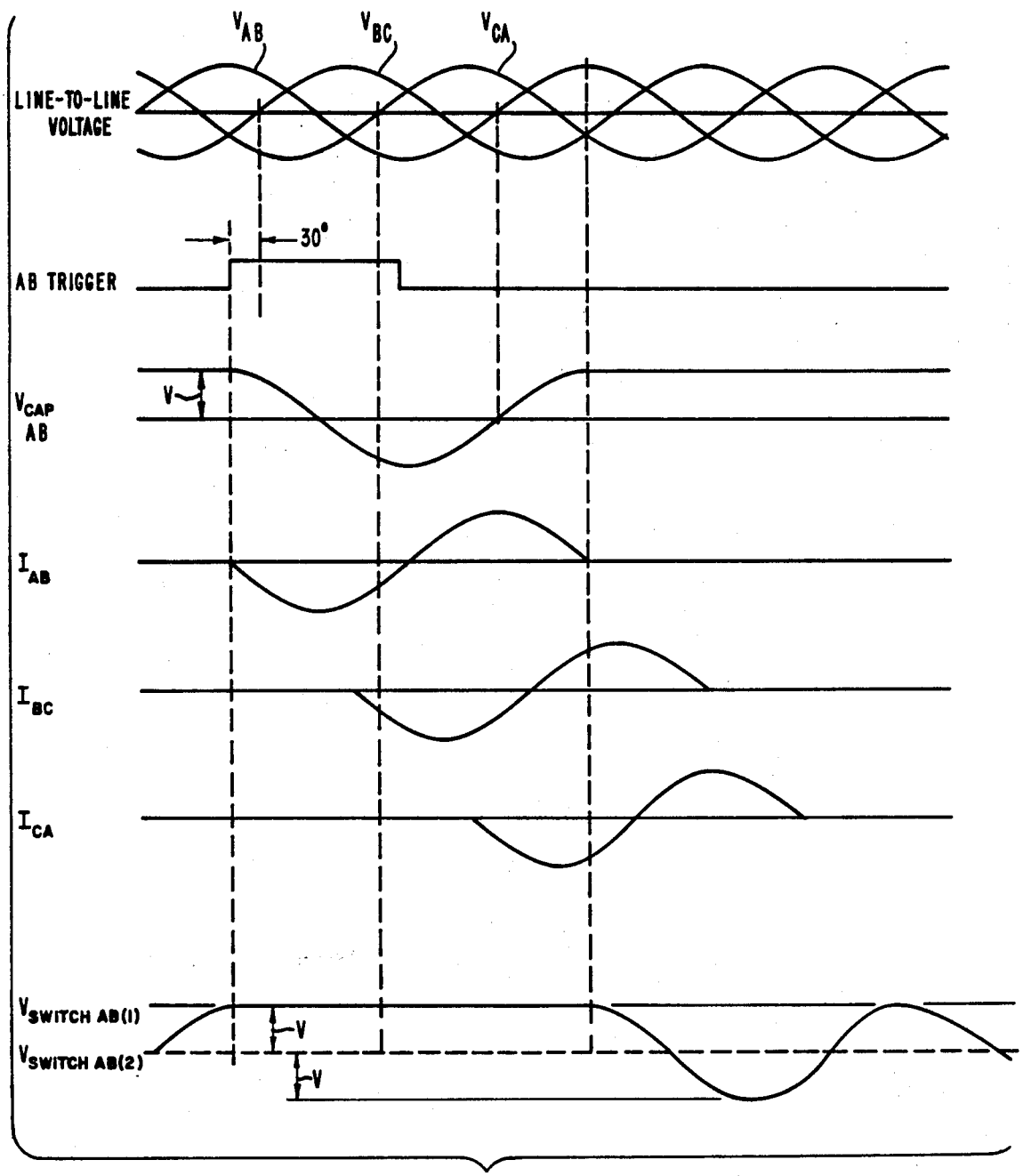
FIG. 4 shows exemplary waveforms illustrating the operation of the array of FIG. 2.

FIG. 4 indicates the representative waveforms of operation for the configuration of FIG. 3 for a single trigger signal on line 34a. As shown, the nominal capacitor current ramps from zero and has a sinusoidal shape. The inductor L is an air-core inductor coupled in series with the capacitor to accommodate slight timing errors or errors due to waveform distortions. The inductor limits the rate of change of current with time. The inductors further serve to protect the switches during line faults by keeping the peak current within the switch surge current rating.

In operation, the capacitors are switched off the line by removing the trigger signals. The switches have self (uncontrolled) gating in one polarity, so that on the following half cycle, the switches naturally commutate off at a current zero crossing. The switched-off capacitor is left holding a charge proportional to the line-to-line peak voltage. The self gating of the switches in one polarity insures that the "off" capacitors remain fully charged.

Since a capacitor held off the line is charged to the peak system voltage, double the system line-to-line voltage is seen by the semiconductor switch or switches in series with it. For example, the switches must tolerate 1250 volts in a 440 volt, 60 Hertz system, or 1080 volts in a 380 volt 50 Hertz system. Accordingly, the embodiment of FIG. 3 is particularly advantageous since two relatively low voltage (and low cost) moderate current switches may be used in series with each capacitor section.

The capacitor current is nominally a sine wave, but because the capacitor current is proportional to the derivative of voltage, in practice this signal can depart significantly from the sine wave. For this reason, the trigger signals are provided (as described more fully below) are relatively wide. In the preferred form, the trigger command is provided whenever a switch is desired to be on.

The particular configuration of FIG. 3 provides a relatively compact arrangement wherein the TRIAC, SCR and anti-parallel diode all may be connected to the bus elements forming the output lines, which in turn function as electrically hot heat sinks, thereby avoiding the need for individual electrical isolation of the power semi-conductors.

Figure 5:
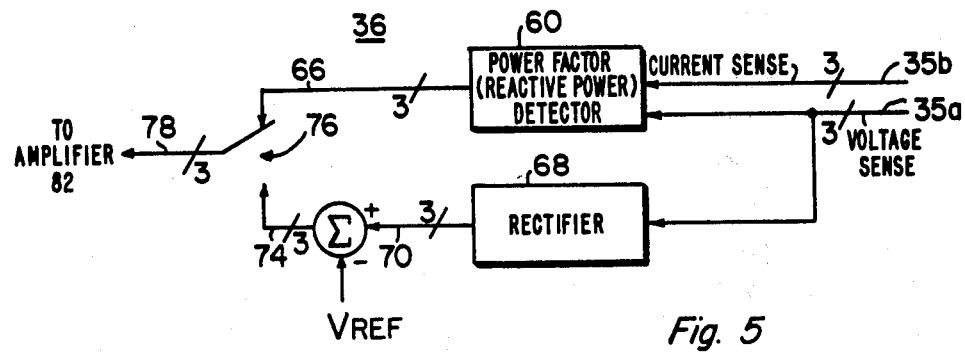
FIG. 5 shows in block diagram form, the feedback sensor of the system of FIG. 1.

FIG. 5 shows the feedback sensor 36 for the present embodiment. Sensor 36 includes a power factor detector network 60 coupled to the voltage sense lines 35a and the current sense lines 35b from the output lines of machine 12. Detector 60 provides output signals on lines 66 which are representative of the reactive power at terminals 14, which in turn are related to the power factors at terminals 14. In alternate embodiments, detector 60 may provide signals directly representative of the power factors at terminals 14.

Sensor 36 also includes a rectifier network 68 coupled to the voltage sense lines 35a. Rectifier 68 provides signals on lines 70 representative of the amplitudes of the voltages at the terminals 14. A summation network 72 provides signals on lines 74 representative of the difference in amplitude of the voltages at terminals 14 and a reference signal. A switch 76 is arranged to be selectively operated in a manner coupling the signals from lines 66 or lines 74 to output lines 78 of the sensor 36. The switch 76 may be operated in conjunction with the switch 16, so that during grid-connected operation, the signals from power factor detector 60 are coupled to lines 78 when switch 16 is in its closed position (coupling the system 10 to the power grid). When the switch 16 is in its open position, i.e. for autonomous operation, the switch 76 couples the signals from lines 74 to lines 78.

Figure 6:
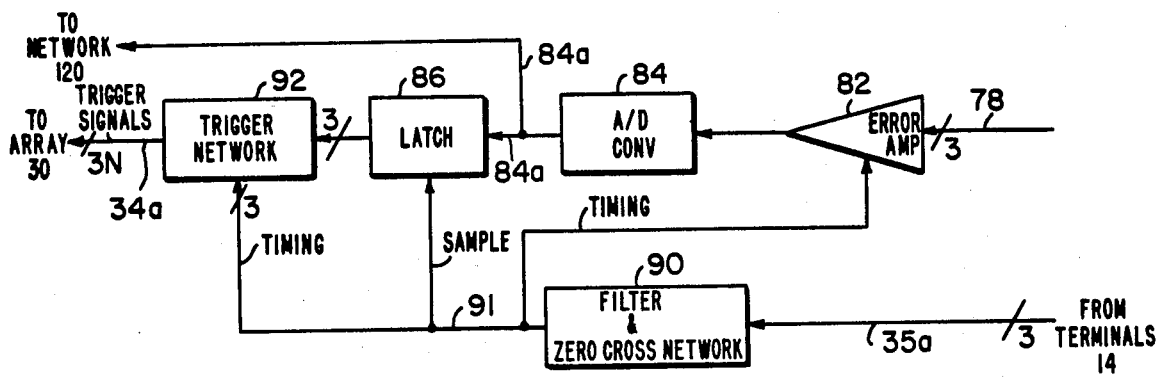
FIG. 6 shows in block diagram form, the trigger signal generator of the system of FIG. 1.

FIG. 6 shows the trigger signal generator 34 in detailed form. Generator 34 includes an error amplifier 82 coupled to signal lines 78 and to timing signal lines 91. In some embodiments, amplifier 82 may include an input multiplexer and an output demultiplexer. The output from amplifier 82 may have its signal time modulated such that sampling in the following latch 86 provides somewhat different capacitor corrections to the individual phases of the system. In this form, balanced voltages can be maintained in the presence of unbalanced loads.

In the present embodiment, the output from amplifier 82 is coupled to a binary A-to-D convertor 84, which in turn is coupled to latch 86. A filter and zero cross network 90 is coupled to terminals 14 to provide a sampling signal to the latch 86 at the system operating frequency. The sampled signal from latch 86 is applied to a trigger network 92. The filter and zero cross network 90 also provides appropriate timing signals to generate the signals for switching the stages of array 30 in and out of operation. Switching "in" occurs at such times when the fully charges capacitors in array 30 are coupled to the peak voltages at the lines of machine 12. Switching "out" occurs prior to a peak voltage with actual turn off at naturally occurring zero capacitor current (which is normally at the voltage peak).

The trigger network 92 is responsive to the sampled values in latch 86 to select and activate the appropriate ones of the 3N trigger signal lines for the appropriate stages to adaptively modify the value of the capacitances coupled across the output lines of machine 12. In various forms of the invention, the trigger network 92 may include a programmed microprocessor, or some other suitable form of computational network.

With the control of individual branches of the various stages of array 30, both line-to-line and line-to-neutral unbalanced loads may be accommodated, provided that the net loads (before correction) are inductive (since only capacitors are used for control).

Figure 7:
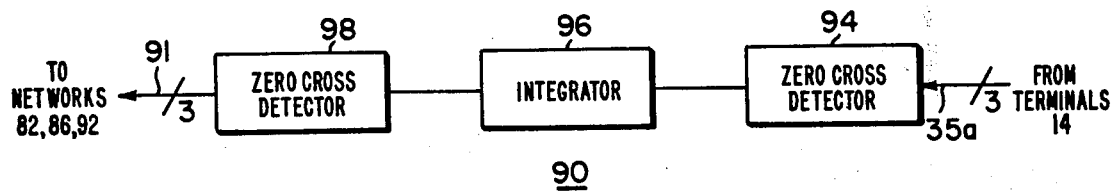
FIG. 7 shows in block diagram form, the filter and zero cross detector of the trigger signal generator of FIG. 6.

In the preferred form of the invention, the filter and zero cross detector network 90 has the form shown in FIG. 7 wherein a first zero crossing detector network 94 is coupled to an integrator 96, which in turn is coupled to a second zero cross detector network 98. This form of filter and zero crossing detector 90 is particularly advantageous where the line-to-line voltage at terminals 14 includes transients (such as due to rectifier loads) which may cross zero. In this configuration, the network 94 provides a binary signal which has a state change for each zero crossing of the input. The integrator 96 integrates this resultant signal to provide a nominally triangle-waveform which has zero crossing points nominally at the desired switching times. The second zero cross detector 98 provides a trigger timing signal for controlling the switching of the stages for the various line-to-line pairs.

Figure 8:
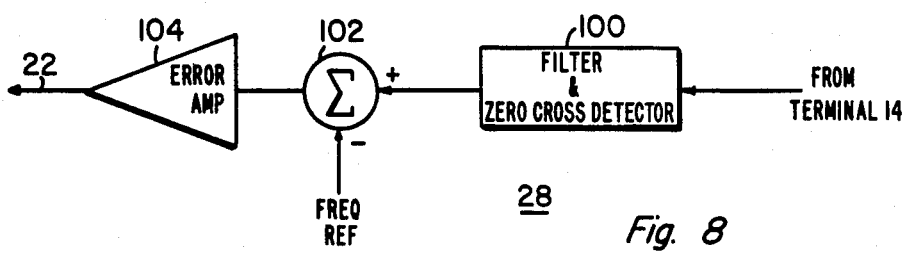
FIG. 8 shows in block diagram form the frequency controller of the system of FIG. 1.
Figure 9:
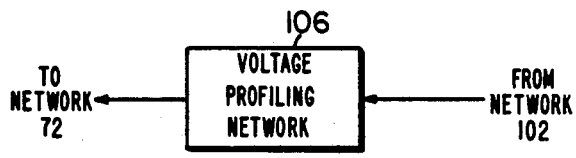
FIG. 9 shows in block diagram form, an exemplary voltage profiling network for use with the system of FIG. 1.

FIG. 8 shows the frequency controller for the preferred embodiment. In this embodiment, the controller 28 includes a filter and zero crossing detector network 100 coupled to terminals 14. The output of network 100 is coupled to a summing network 102 which in turn is coupled to an error amplifier 104 for driving line 22. In practice, the network 100 may be the same as corresponding network 90 in generator 34. In such cases, the output from generator 90 may be used directly in controller 28 in place of that provided by network 100. The summing network 102 provides a frequency error signal representative of the difference in frequency of the voltage at terminals 14 and a reference frequency. This frequency error signal is applied by way of error amplifier 104 and line 22 to the variable speed prime mover.

In one form of the invention, the output from the summing network 102 may be coupled by way of a voltage profile network to an input of the summing network 72 of the feedback sensor 36. With this configuration, the voltage profile network 106 modifies the commanded system voltage on line 78 as a function of the system frequency error. In normal operation, the system 10 frequency error is small, and there is no significant output from the voltage profile network 106. However, in momentary overload situations, e.g. when the system 10 is called upon to start relatively large motor loads, the resultant slow down at the prime mover 20 can be directly sensed by detecting the reduced frequency on output lines of machine 12. Network 106 detects times when the frequency at terminals 14 falls below a predetermined threshold, and for a range of frequencies below that threshold, provides an appropriate signal to network 72 to establish a relatively low output voltage from machine 12, for example, by reducing the voltage to 0.707 of the nominal voltage when a few percent slow-down is detected. As a consequence of this operation, the effective load seen by the prime mover 20 is substantially reduced and that element may continue to operate near the normal system frequency where it can provide more power and thus maintain the highest possible output voltage. This feature is particularly advantageous in preventing inadvertent cut outs when relays are used in the system. This configuration may be utilized in the situation where a single induction generator system 10 is operating, or where a plurality of such induction generator systems are coupled in parallel at terminals 14.

It is well known that during induction generator start-up, an initial remnant flux must either exist in the machine or be placed in the machine 12. In the prior art, this remnant flux may be placed in the machine at zero mechanical speed with a D.C. bias current in one winding of the generator, or alternatively a sufficient remnant flux naturally exists in the machine from the last time it was operated. For a single autonomous induction generator system, the switched capacitor array may be used to create voltage build-up in the generator automatically when the machine speed reaches some minimum value. The load is normally disconnected during such flux initialization, and until proper output voltage and frequency are established. However, when a spinning but unexcited induction machine is connected to an external grid, or another induction generator, a very large current transient occurs until the flux builds up in this machine. For example, such a transient might well cause an instantaneous voltage drop on the order of 50% if two identical machines are paralleled in this manner. If the machine to be added to the grid is initially excited by using a separate capacitor bank, the transient would very likely be even worse unless the frequencies are phase locked using conventional synchronous machine line connection techniques.

Figure 10:
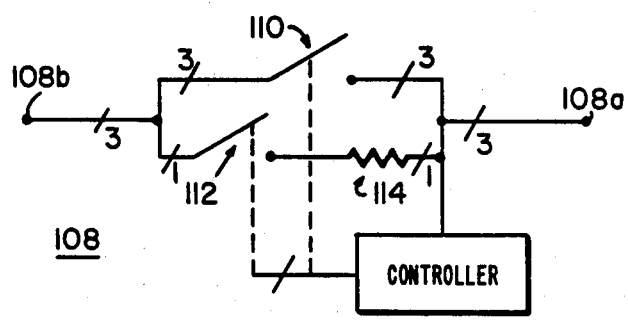
FIG. 10 shows in block diagram form, an exemplary thermistor network or use with the system of FIG. 1.

In accordance with the present invention, a thermistor network, as shown in FIG. 10, may be used to bring an unexcited, but near synchronously turning induction machine on-line with a minimal transient. The network of FIG. 10 includes a two terminal ($108a$ and $108b$) network having a three phase switch 110 coupled between those terminals $108a$ and $108b$, and a series connected single phase switch 112 and thermistor 114 coupled in parallel with one phase of the switch 110. The thermistor 114 has a temperature dependent resistance characteristic, providing a relatively high resistance at low temperatures and a relatively low resistance at high temperatures. An associated controller 116 controls the operation of the switches 110 and 112. The network 108 is coupled between one of the terminals 14 of lan operating or grid-connected induction machine and the corresponding output terminals of the induction machine to be brought on line. By way of example, to bring system 10 of FIG. 1 on line to the external grid, network 108 mayb be coupled into one of the output lines between terminals 14 and switch 16. In other multiple systems, a single network 108 may be used repetitively (after cooling down) to sequentially bring the multiple systems on line. In alternative systems, separate thermistor branches similar to the branch including switch 112 and thermistor 114 may be similarly coupled in each of the output lines from the induction machine.

In operation, with the system 10 including network 108 which is to be coupled to an external grid (e.g. by switch 16) or another induction generator, the switches 110 and 112 are initially controlled by controller 116 to be in their open positions. Then, the unexcited induction machine 12 is brought up to a speed close to the desired line frequency. Frequency or phase locking is not required. The switch 112 is then closed by controller 116, bring the thermistor 114 into one of the output lines which connects the two generators in parallel. With this configuration, the power dissipated in the thermistor 114 causes its temperature to increase, thereby lowering its resistance. By appropriate thermistor device selection, it will be understood that the thermistor (or plurality of series connected thermistors) is selected so that its resistance-temperature characteristic is matched to the rate of voltage build-up. Consequently, the current in the thermistor increases and its resistance decreases until the temperature and resistance reach such values so that the current through there is essentially equivalent to the steady state final value which is required for the no-load magnetizing current. At this point, controller 116 opens switch 112 while closing the three phase switch 110. The system 10 is then fully on-line without a transient. In practice, controller 116 changes the state of switches 110 and 112 by detecting when the thermistor voltage falls below a predetermined threshold, or alternatively may just provide a predetermined time delay. The same thermistor 114 may be used after cooling to provide nearly transient free excitation for additional systems as they are brought on-line.

The prior art induction generator systems have a relatively limited ability to start A.C. motor loads. Typically, when an A.C. motor load is started, that load requires much more reactive current than during normal (steady state) run operation. If insufficient capacitance is available in the induction generator capacitive array 30, the voltage provided by system 10 rapidly collapses toward zero when a relatively large A.C. motor is switched onto the output line 14. Motor starting ability of the system is enhanced by switching in an overload capacitance array network across the output terminal 14 during overload conditions, such as during start-up of a large A.C. motor.

Figure 11:
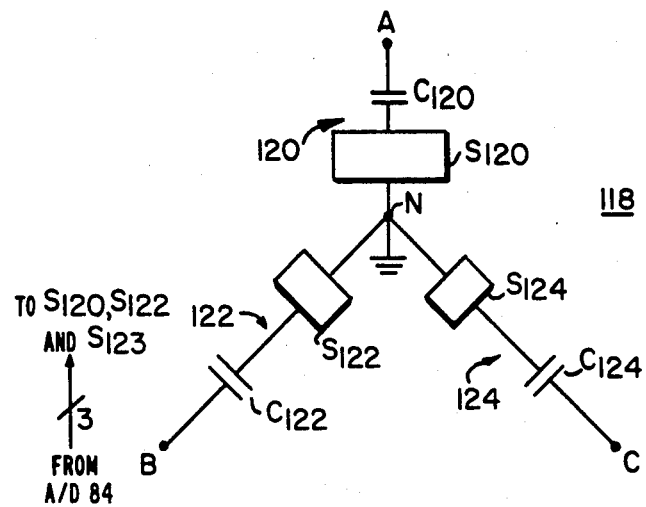
FIG. 11 shows an overload capacitance array network for the system of FIG. 1.
Figure 12:
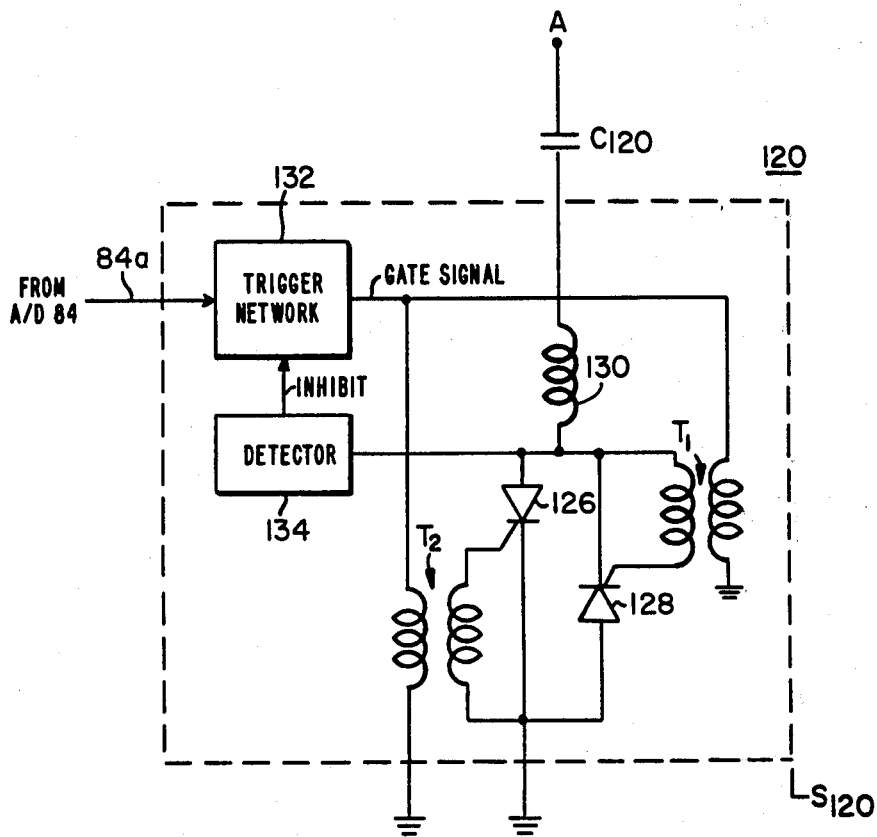
FIG. 12 shows in schematic form, a branch network for the network of FIG. 11.

FIG. 11 shows an exemplary overload capacitance array network 118, including three similar branch networks 120, 122 and 124, for connection in a "wye" configuration to lines A, B and C and to a neutral (or ground) line N of the system 10 of FIG. 1. Each of branch networks 120, 122 and 124 includes a capacitor (denoted C with a corresponding sub-script) and a switch (denoted S with a corresponding sub-script). By way of example, FIG. 12 shows a particularly economical embodiment of the branch network 120 which includes a high current density A.C. electrolytic capacitor $C_{120}$ coupled in series with a semiconductor switch network $S_{120}$ between the output line A and ground. In the illustrated embodiment, the capacitor $C_{120}$ may be a "motor start" capacitor, designed for intermittent duty, such as the Sprague Type 9A. This capacitor type generally includes a pair of polarized capacitor connected back-to-back in series.

The switch network $S_{120}$ includes a pair of oppositely directed SCR's 126 and 128 connected in parallel to form a bidirectional switch. The pair of SCR's is connected in series with an air core inductor 130 between capacitor 120 and a common potential, such as ground. The output of a trigger network 132 is connected to the primary coils of trigger transformers $T_1$ and $T_2$. The secondary coils of transformers $T_1$ and $T_2$ are connected across the cathode and gate terminals of SCR's 126 and 128, respectively. A detector 134 provides an inhibit signal to the trigger network 132. The trigger network input is coupled to A/D converter 84. In operation, when extra capacitance is required (which may be due to AC motor start-up), the signal from A/D 84 normally causes a gate signal from network 132 to switch SCR's 126 and 128 to their conductive state. However, if the voltage across SCR's 126 and 128 is above a predetermined threshold, the inhibit signal from detector 134 prevents turn-on of SCR's 126 and 128 to their nonconductive states until a point in the waveform when transients are minimal an arbitrary initial condition on the capacitor voltage. With this configuration, the network 118 is optimized to accommodate start-up of an uncharged capacitor or re-start up if the relatively poorer thermal and electrical capacitor voltage is anywhere between zero and full voltage.

In the preferred embodiment, the motor start capacitors are connected in a "wye" configuration to allow use of available lower capacitor voltage ratings. In lower voltage applications, a "delta" configuration may more economically be used. In all of these configurations, capacitor thermal protection in situations of inadvertent capacitor over use may be accommodated by inhibiting the motor start array switches if the series air core inductor exceeds a predetermined temperature.

Figure 13:
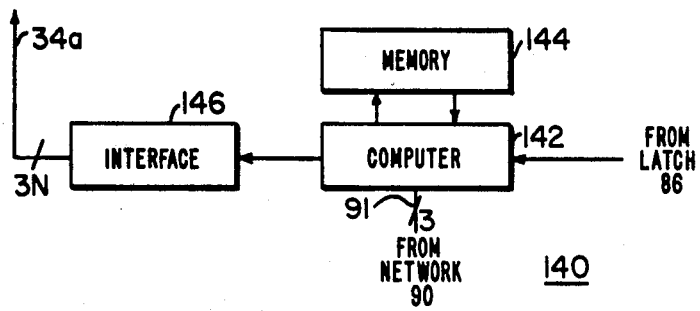
FIGS. 13–18 show embodiments of the system of FIG. 1 adapted for correction of power factor for unbalanced loads.

FIG. 13 shows, in block diagram form, an alternate power factor correction network 150 which may replace trigger network 92 of FIG. 6. Network 140 includes a computer 142 and associated memory 144 and an interface 146. When switch 76 of FIG. 5 connects line 66 to line 78, then network 140 operates as a closed loop power factor correction system which provides power factor correciton on a periodic basis for loads which may be balanced or unbalanced.

During the first cycle and for all subsequent cycles, the power factor correction network measures the residual three reactive power terms (each quadrature line current times its corresponding line-toneutral voltage) during one cycle. The resultant residual or error signals are representative of the change in reaccive power since that last correction. The system 140 then uses this error signal to determine the capacitance to be added to or subtracted from the respective phases of the array 30 during the next correction cycle. In FIG. 13, the memory 144 provides storage for data representative of the state of network 30, i.e. data which defines the existing capacitors that are on-line. Between power factor correction cycles, computer 142 monitors the signals from power factor detector 60 to determine the three independent line-to-line capacitance changes required to correct the power factor. Computer 142 sums these incremental values with the previous values as stored in memor 144 to compute the new desired values. At a correction time, computer 142 generates control signals representative of the new values which are to be switched from the network 30. These control signals are the trigger signal which are applied by way of interface 146 to the various stages of array 30.

Thus, the computer 142 measures the residual line-to-neutral reactive power. This value may be positive or negative. In systems where array 30 is a wye configuration, the complement of this reactive power is the value required to compensate (i.e. the corresponding value capacitive increment, positive or negative, may be switched into the system from line-to-neutral).

In the preferred embodiment, which utilizes a three phase delta configuration capacitor array 30, the computer 142 first determines the required incremental line-to-neutral reactive power correction value for the output line terminal of each line, and then converts that value to an equivalent reactive power delta correction. The incremental delta capacitor equivalent associated with a determined incremental wye value is formed from two equal incremental delta capacitors having one terminal coupled to the associated wye terminal, with each of these incremental delta capacitors having the same sign and one-third the capacitance of the incremental value of the wye computed value. The third opposing leg incremental delta capacitor has an opposite sign and has the same one-third capacitance magnitude.

These above values for the various output terminals are incremental values. The net required delta capacitors are determined by the computer 142 by adding to the most recent corrective state, the required change, which in the algebraic sum of the three incremental capacitance values for each terminal. Thus, the three new capacitors for the delta network are obtained by adding appropriately transformed wye incremental values to the previous delta value.

The computer 142 then generates the trigger signals on line 34a which switch the desired total capacitor value across the various lines at the next cycle during which power factor correction is made.

In cases where a computed delta capacitive value for power factor correction is determined to have a net negative value, the computer 142 modifies the values in the following optimum manner before generating the trigger signals. Computer 142 first subtracts one-third of the magnitude of this negative value from each of the other non-negative line-to-line capacitors to specify two new total values to be placed on line. The terminal pair associated with the original desired negative capacitor compensation is left uncompensated.

FIGS. 14–18 show an alternate configuration for this power factor correction network for a three phase system 10 having a delta configuration capacitor array 30 and adapted to optimally compensate for unbalanced line-to-line or line-to-neutral loads. In this configuration, network 160 (FIG. 14) replaces block 60, lines 66 and 78 of FIG. 5 and blocks 82 and 84 of FIG. 6. Timing signals for the various sampling operations provided by network 160 are provided by line 91 from network 90. In network 160, a pulse width modulator (PWM) type multiplier is used for the reactive power computation to achieve accuracy and simplicity, although other forms of multipliers would also provide the necessary data. The pulse width modulation representations of the line-to-neutral voltages are created by comparing the line-to-neutral voltage against a triangle reference. These digital representations allow for a simpler, digital type multiplication implementation with the integrated currents. For fixed voltage, the reactive power measurement translates to a capacitor compensation value. If the voltage increases, the compensation capacitors reactive power also increases. Thus, for the same reactive power at higher voltage, a smaller compensation capacitor is appropriate, indicating that the multiplier product (reactive power measurement) should be voltage compensated before using it to specify capacitance. These line voltage variations can be substantially compensated by appropriately varying the amplitude $V_p$ of the triangle reference, $V_{SAW}$. This form of the invention will now be described in detail.

Figure 14:
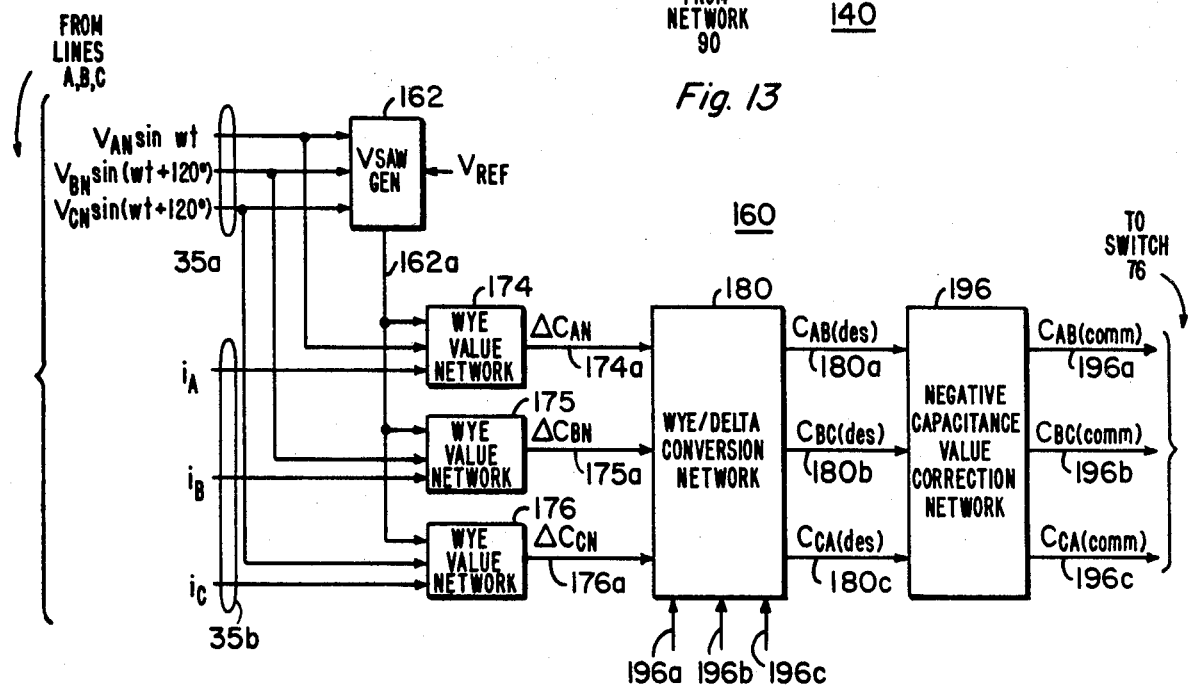

FIG. 14 shows a general block diagram of network 160, which includes $V_p$ generator 162 (shown in detail in FIG. 15) coupled by way of voltage sense lines 35a to output lines A, B, and C of machine 12. Each of lines 35a provides a sinusoidal signal representative of the line-to-neutral voltage for that line (represented in FIG. 14 by $V_{AN}$ sin wt, $V_{BN}$ sin (wt+120°) and $V_{CN}$ sin (wt+240°) for lines A, B, and C, respectively). Generator includes a full- (or half-) wave rectifier and filter 164, scaling networks 166 and 167, summing network 168 and triangle generator 169. For this block diagram, the signal $V_{REF}$ equals $K_1$ times the nominal full wave output voltage for machine 12 and the nominal triangle wave amplitude $V_p$ (nom) equals $V_{REF}$. With this configuration, generator 162 provides a compensated triangle output, $V_{SAW}$ on line 162a having a peak value $V_p$ and a frequency $f_o$. $V_p$ thus corresponds to $[(2V_L/V_L(\text{nom}))-1]V_{REF}$, where $V_L$ is the amplitude of the signal on line 166a. This linear first order compensation substantially eliminates the scaling error due to compensation capacitor dependence on voltage, which improves the system dynamic response.

Network 160 also includes three similar wye value networks 174–176, where each of these networks is coupled to line 162a, one of lines 35a, and an associated one of lines 35b (which provide signals $i_A$, $i_B$ and $i_C$ representative of the currents in lines A, B and C, respectively). Network 174 is shown in detailed form in FIG. 16. Network 174 includes scaling networks 177 and 178, multiplier 180, summing network 182, zero cross detector 184 and integrator 186 (which is reset once during each compensation cycle). The networks 175 and 176 are similarly configured. With this configuration, networks 174, 175 and 176 provide output signals on lines 174a, 175a and 176a, respectively, representative of the incremental wye (line-to-neutral) capacitance values ($\Delta C_{AN}$, $\Delta C_{BN}$ and $\Delta C_{CN}$, respectively) for power factor correction.

Thus, with this configuration, the line-to-neutral power factor signals are generated by simultaneously integrating (after reset), over a 360° interval, the products of the line-to-neutral voltages for the line pairs, and the integrals of the a.c. component of the corresponding line currents. As a result, the system provides substantial harmonic reduction. Moreover, the average products of the harmonics are negligible even when both current and voltage waveforms contain distortions. The system also provides the 90° phase shift of the quadrature current so that the product output contains a d.c. term proportional to reactive power only.

Figure 17:
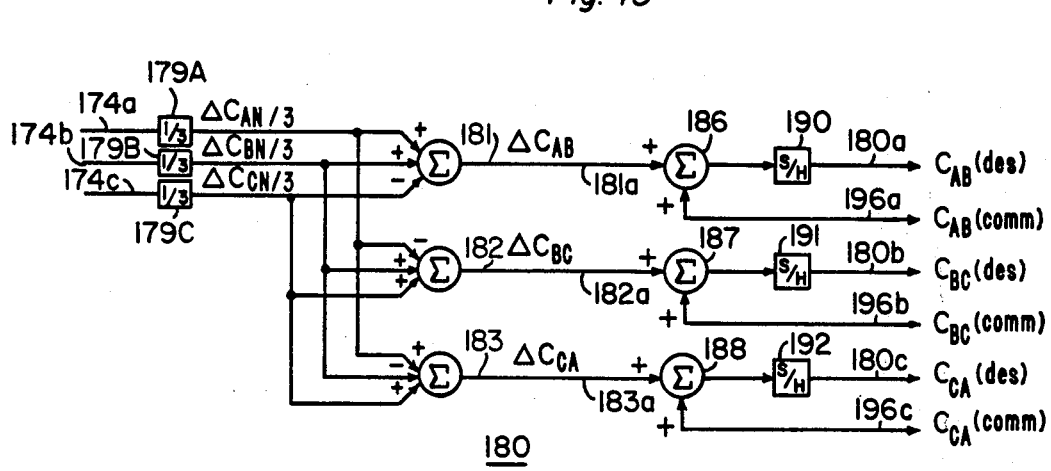

Lines 174a, 175a and 176a are each coupled to a wye/delta conversion network 180 (shown in detail in FIG. 17). Network 180 includes three scaling networks 179A, 179B and 179C and three summing networks 181–183 which provide incremental delta (line-to-line) capacitance values ($\Delta C_{AB}$, $\Delta C_{BC}$ and $\Delta C_{CA}$, respectively) on lines 181a, 182a and 183a for power factor correction. The signals on lines 181a, 182a and 183a are coupled to associated ones of summing networks 186–188 where those signals are summed with the respective ones of commanded capacitance signals $C_{AB}$(comm), $C_{BC}$(comm), and $C_{CA}$(comm) to provide signals which are sampled and held in sample-and-hold (S/H) networks 190–192, respectively. The outputs from S/H networks 190–192 provide desired capacitance signals $C_{AB}$(des), $C_{BC}$(des), and $C_{CA}$(des) on lines 180a, 180b and 180c, respectively. The latter signals represent the capacitance already across the various terminals of machine 12 (from the next previous measurement cycle) plus the incremental value determined during the current measurement cycle.

Figure 18:
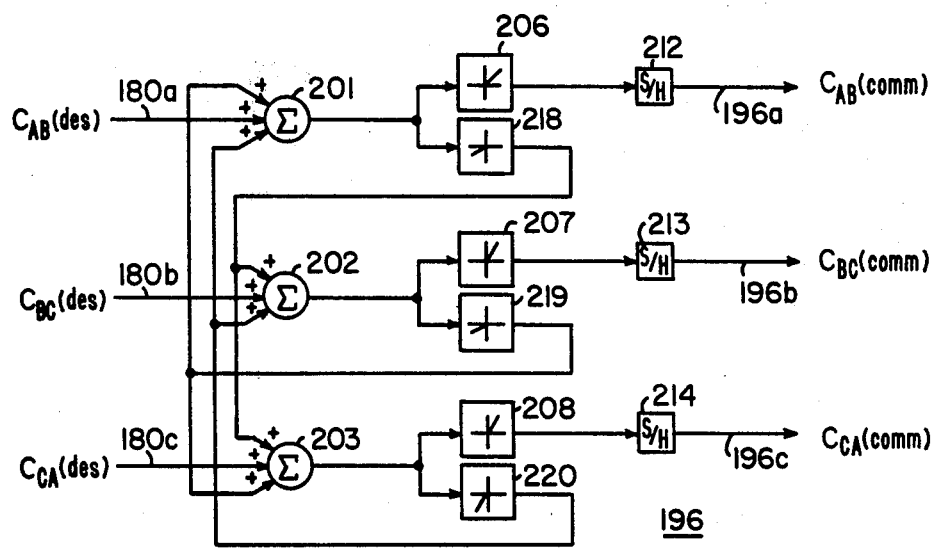
Figure 15:
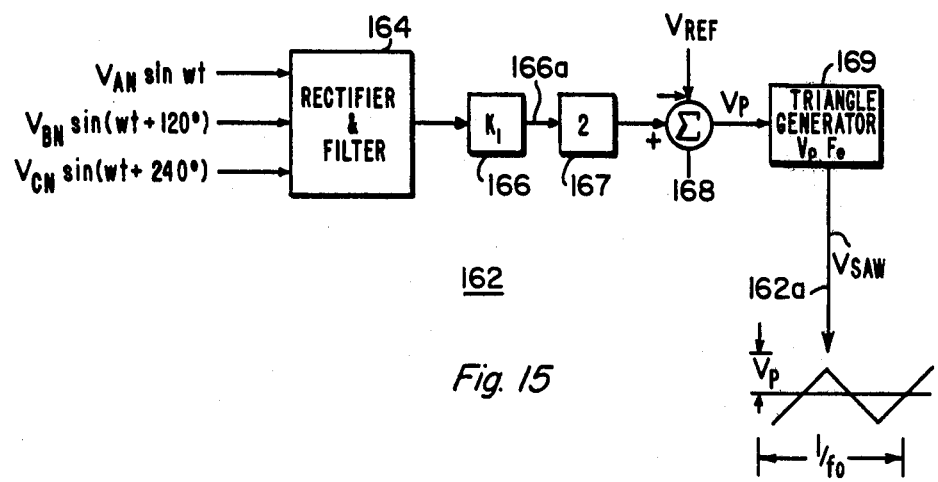
Figure 16:
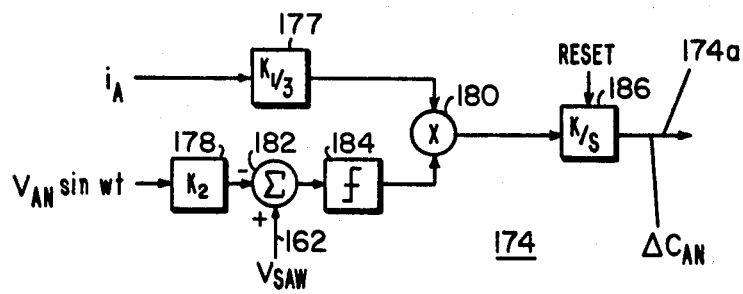

The lines 180a, 181a, and 182a are coupled to negative capacitance value correction network 196 (shown in detail in FIG. 18). Network 196 includes three summing networks 201–203 having an input coupled to a respective one of lines 180a, 180b and 180c. Each of networks 201–203 has its output coupled to one of three networks 206–208 having a continuous $V_{in}/V_{out}$ transfer function which passes through (0,0) and has a slope of 1 in the first quadrant and output equal to zero in the third quadrant. The output from each of networks 206–208 is coupled by way of one of sample-and-hold (S/H) networks 212–214 to one of output lines 196a, 196b and 196c. Each of networks 201–203 also has its output coupled to one of three networks 218–220 having a $V_{IN}/V_{OUT}$ transfer function which passes through (0,0) and has a slope equal to 0 in the first quadrant and a slope equal to ⅓ in the third quadrant. The output from each of networks 218–220 is coupled to a summing input of the two networks 201–203 which are not coupled to its input. With this configuration, when one of the desired capacitance signals is negative, command capacitance signals are generated which correct the command values to provide optimal power factor correction with zero or positive capacitances only.

In summary, the system 10 using network 142 performs simultaneous three-phase reactive power sensing during one 360 degree interval of the line frequency by simultaneously integrating three signals, each being proportional to the product of an integrated (90 degree phase shift of fundamental) line current and its respective sinusoidal line-to-neutral voltage. The three integrators are reset prior to initiation of a new measurement cycle. As a result, by integrating over 360 degrees, the reactive power without additional filtering is determined during one cycle. In this configuration, the integrator 176 provides harmonic reduction, 90 degree phase shift and frequency compensation (achieved by integrating line current prior to multiplication by line-to-neutral voltage). The present system is a closed loop configuration in that a power factor correction value is already present in parallel with the load thus the reactive power error is measured and the correction value is adaptively modified. The system 10 provides relatively high speed closed loop power factor correction and can also accommodate unbalanced line-to-line and line-to-neutral inductive loads.

In general, the compensation capacitors are not taken on (or off) line during the 360 degree measurement interval to avoid measurement errors. The new values of capacitance, computed after a measurement, are placed on line at the next opportunity consistent with the transient-free switch-on.

This reactive power compensation approach minimizes the three-phase RMS reactive currents even when full compensation is not possible with delta corrected capacitors only. This similar situation arises, for example, during heavy unbalanced loading such as a single phase line-to-neutral connected motor load is present.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. An induction generator system comprising:
   A. an n-phase induction machine having an input shaft and at least n output lines, where n is an integer, wherein each output line is coupled to an associated output terminal,
   B. means for generating a frequency control signal representative of the difference between the frequency of the voltage of at least one of said output terminals and a reference value,
   C. torque generating means responsive to said frequency control signal for applying a torque to said input shaft, said applied torque being related to said frequency control signal, D. an N-stage switched capacitor array, where N is an integer, each stage including n capacitor networks, each network being associated with a pair of said output lines, wherein the capacitor networks within each stage are each characterized by a predetermined capacitance for that stage, and wherein each of said capacitor networks includes an associated capacitor switch means, each switch means being responsive to a trigger signal for selectively coupling said capacitor network across its associated pair of output lines, E. feedback means coupled to said output lines and including trigger means for generating said trigger signals, wherein the capacitor networks of X of said N stages are characterized by binary weighted capacitance values from stage to stage, where X is an integer, and wherein the capacitor networks of N-X of said N stages are characterized by substantially equal capacitance values from stage to stage.

2. An induction generator system comprising:

A. an n-phase induction machine having an input shaft and at least n output lines, where n is an integer, wherein each output line is coupled to an associated output terminal, B. means for generating a frequency control signal representative of the difference between the frequency of the voltage of at least one of said output terminals and a reference value, C. torque generating means responsive to said frequency control signal for applying a torque to said input shaft, said applied torque being related to said frequency control signal, D. an N-stage switched capacitor array, where N is an integer, each stage including n capacitor networks, each network being associated with a pair of said output lines, wherein the capacitor networks within each stage are each characterized by a predetermined capacitance for that stage, and wherein each of said capacitor networks includes an associated capacitor switch means, each switch means being responsive to a trigger signal for selectively coupling said capacitor network across its associated pair of output lines, E. feedback means coupled to said output lines and including trigger means for generating said trigger signals, wherein said feedback means includes power factor detection means for generating a power factor signal representative of the power factor at said output terminals, and wherein said feedback means is selectively operable in a first state to couple the output terminals of said induction machine to the power lines of an external power grid, said external power grid having a predetermined nominal frequency and voltage on said power lines, and further to couple said power factor signal to said trigger means whereby said induction generator system delivers only real power to said external power grid, and wherein said feedback means includes a voltage detection means for generating one or more amplitude signals representative of the difference between the amplitude of the voltages at said output terminals and a reference value, and wherein said feedback means is selectively operable in a second state to couple said amplitude signals to said trigger means whereby said induction generator system delivers real and reactive power to loads coupled to said output terminals at regulated voltage.

3. The system according to claim 2 wheren said trigger means includes means responsive to said power factor signal when said feedback means in said first state to periodically measure said power factor signal and generate trigger signals for one or more of stages of said array, whereby the capacitances of the capacitor networks coupled across said pairs of output lines is substantially minimize the reactive power at said output lines, and wherein said trigger means further includes means responsive to said amplitude signal when said feedback means is in said second state to periodically sample said amplitude signal and generate trigger signals to one or more stages of said array, whereby the caacitances of the capacitor networks of said array coupled across said pairs of output lines substantially minimize load-induced voltage variations at said output lines.

4. The system according to claim 3 wherein said trigger means includes for each pair of said output lines:

(1) a first zero crossing detector means coupled to said pair of output lines for generating a first signal having a first value when the line-to-line voltage for said pair is greater than zero and a second value when the line-to-line voltage for said pair is less than zero, (2) an integrating means for generating a second signal representative of the integral of time varying portion of said first signal, and (3) a second zero crossing detector for generating a third signal, said third signal having a first value when said second signal is greater than zero, and a second value when said second signal is less than zero, wherein said third signals correspond to said trigger signals for the capacitor switch means for the respective pairs of output lines.

5. A system according to claim 2 wherein said system further includes at least one thermistor network coupled between one of said output lines and its associated output terminal, said thermistor network including:

(1) a thermistor device and a first switch coupled in series between said output line and output terminal, wherein said thermistor has a characteristic resistance which varies with temperature between a relatively high resistance at a predetermined low temperature and a relatively low resistance at a predetermined high temperature, and wherein said first switch is selectively operable in a first state to establish a first current path between said output line to said output terminal by way of said thermistor device, and selectively operable in a second state to interrupt said first current path, (2) a second switch means selectively operable in a first state to establish a second current path between said output line and said output terminal by way of said second switch, and selectively operable in a second state to interrupt said second current path, and (3) a control means selectively operable in a first (RUN) state for controlling said first switch to be in its first state and said second switch to be in its second state, and selectively operable in a second (START UP) state for controlling said first switch to be in its second state and said second switch to be in its first state, and selectively operable in a third (OFF) state for controlling said first and second switches to be in their second states.

6. A power grid network comprising two or more induction generator systems, each induction generator system comprising:
   A. an n-phase induction machine having an input shaft and at least n output lines, where n is an integer, wherein each output line is coupled to an associated output terminal,
   B. means for generating a frequency control signal representative of the difference between the frequency of the voltage of at least one of said output terminals and a reference value,
   C. torque generating means responsive to said frequency control signal for applying a torque to said input shaft, said applied torque being related to said frequency control signal,
   D. an N-stage switched capacitor array, where N is an integer, each stage including n capacitor networks, each network being associated with a pair of said output lines, wherein the capacitor networks within each stage are each characterized by a predetermined capacitance for that stage, and wherein each of said capacitor networks includes an associated capacitor switch means, each switch means being responsive to a trigger signal for selectively coupling said capacitor network across its associated pair of output lines,
   E. feedback means coupled to said output lines and including trigger means for generating said trigger signals,
wherein the output terminals of said induction generator systems are coupled to each other, and
wherein said feedback means for each system includes a voltage detection means for generating an amplitude signal representative of the difference between the amplitude of the voltage at said output terminals and a reference value, and for coupling said amplitude signal to said trigger means, whereby said induction machine maintains a predetermined voltage to loads coupled to said output terminals.

7. A power grid network according to claim 6 wherein at least one of said induction generator systems includes at least one thermistor network coupled between one of said output lines and its associated output terminal, said thermistor network including:
   A. a thermistor device and a first switch coupled in series between said output line and output terminal, wherein said thermistor has a characteristic resistance which varies with termperature between a relatively high resistance at a predetermined low temperature and a relatively low resistance at a predetermined high temperature, and wherein said first switch is selectively operable in a first state to establish a first current path between said output line to said output terminal by way of said thermistor device, and selectively operable in a second state to interrupt said first current path,
   B. a second switch means selectively operable in a first state to establish a second current path between said output line and said output terminal by way of said second switch, and selectively operable in a second state to interrupt said second current path, and
   C. a control means selectively operable in a first (RUN) state for controlling said first switch to be in its first state and said second switch to be in its second state, and selectively operable in a second (START UP) state for controlling said first switch to be in its second state and said second switch to be in its first state, and selectively operable in a third (OFF) state for controlling said first and second switches to be in their second states.

8. The system according to claim 6 wherein the amplitude signal coupling means of the feedback means for at least one of said induction generator systems includes means responsive to said frequency signal for modifying said amplitude signal whereby the modified amplitude signal is equal to said amplitude signal when said frequency signal is representative of frequencies outside a predetermined frequency range, and is equal to a predetermined value when said frequency signal is representative of frequencies within said predetermined frequency range, and includes means for coupling said modified amplitude signal to said trigger means in place of said amplitude signal, whereby said induction generator machine delivers real and reactive power to loads coupled to said output terminals at a first predetermined voltage when said frequency is above said predetermined range and at a second predetermined voltage when said frequency is within said predetermined range, where said second predetermined voltage is less than said first predetermined voltage.

9. An induction generator system comprising:
   A. an n-phase induction machine having an input shaft and at least n output lines, where n is an integer, wherein each output line is coupled to an associated output terminal,
   B. means for generating a frequency control signal representative of the difference between the frequency of the voltage of at least one of said output terminals and a reference value,
   C. torque generating means responsive to said frequency control signal for applying a torque to said input shaft, said applied torque being related to said frequency control signal,
   D an N-stage switched capacitor array, where N is an integer, each stage including n capacitor networks, each network being associated with a pair of said output lines, wherein the capacitor networks within each stage are each characterized by a predetermined capacitance for that stage, and wherein each of said capacitor networks includes an associated capacitor switch means, each switch means being responsive to a trigger signal for selectively coupling said capacitor network across its associated pair of output lines,
   E. feedback means coupled to said output lines and including trigger means for generating said trigger signals,
wherein said system further includes at least one thermistor network coupled between one of said output lines and its associated output terminal, said thermistor network including:
   (1) a thermistor device and a first switch coupled in series between said output line and output terminal, wherein said thermistor has a characteristic resistance which varies with temperature between a relatively high resistance at a predetermined low temperature and a relatively low resistance at a predetermined high temperature, and wherein said first switch is selectively operable in a first state to establish a first current path between said output line to said output terminal by way of said thermistor device, and selectively operable in a second state to interrupt said first current path, (2) a second switch means selectively operable in a first state to establish a second current path between said output line and said output terminal by way of said second switch, and selectively operable in a second state to interrupt said second current path, and (3) a control means selectively operable in a first (RUN) state for controlling said first switch to be in its first state and said second switch to be in its second state, and selectively operable in a second (START UP) state for controlling said first switch to be in its second state and said second switch to be in its first state, and selectively operable in a third (OFF) state for controlling said first and second switches to be in their second states.

10. An induction generator system comprising:
A. an n-phase induction machine having an input shaft and at least n output lines, where n is an integer, wherein each output line is coupled to an associated output terminal,
B. means for generating a frequency control signal representative of the difference between the frequency of the voltage of at least one of said output terminals and a reference value,
C. torque generating means responsive to said frequency control signal for applying a torque to said input shaft, said applied torque being related to said frequency control signal,
D. an N-stage switched capacitor array, where N is an integer, each stage including n capacitor networks, each network being associated with a pair of said output lines, wherein the capacitor networks within each stage are each characterized by a predetermined capacitance for that stage, and wherein each of said capacitor networks includes an associated capacitor switch means, each switch means being responsive to a trigger signal for selectively coupling said capacitor network across its associated pair of output lines,
E. feedback means coupled to said output lines and including trigger means for generating said trigger signals, wherein said feedback means includes a voltage detection means for generating an amplitude signal representative of the difference between amplitude of the voltage at said output terminals and a reference value,
means responsive to said frequency signal for modifying said amplitude signal whereby the modified amplitude signal is equal to said amplitude signal when said frequency signal is representative of frequencies outside a predetermined frequency range, and is equal to a predetermined value when said frequency signal is representative of frequencies within said predetermined frequency range,
means for coupling said modified amplitude signal to said trigger means whereby said induction generator system delivers real and reactive power to loads coupled to said output terminals at a first predetermined voltage when said frequency is above said predetermined range and at a second predetermined voltage when said frequency is within said predetermined range, where said second predetermined voltage is less than said first predetermined voltage.

11. An induction generator system comprising:
A. an n-phase induction machine having an input shaft and at least n output lines, where n is an integer, wherein each output line is coupled to an associated output terminal,
B. means for generating a frequency control signal representative of the difference between the frequency of the voltage of at least one of said output terminals and a reference value,
C. torque generating means responsive to said frequency control signal for applying a torque to said input shaft, said applied torque being related to said frequency control signal,
D. an N-stage switched capacitor array, where N is an integer, each stage including n capacitor network, each network being associated with a pair of said output lines, wherein the capacitor networks within each stage are each characterized by a predetermined capacitance for that stage, and wherein each of said capacitor networks includes an associated capacitor switch means, each switch means being responsive to a trigger signal for selectively coupling said capacitor network across its associated pair of output lines,
E. feedback means coupled to said output lines and including trigger means for generating said trigger signals, wherein said trigger means at a first predetermined voltage when said frequency is above said predetermined range and at a second predetermined voltage when said frequency is within said predetermined range, where said second predetermined voltage is less than said first predetermined voltage.

12. The system according to claim 6 wherein said trigger means includes for each pair of said output lines:
(1) a first zero crossing detector means coupled to said pair of output lines for generating a first signal having a first value when the line-to-line voltage for said pair is greater than zero and a second value when the line-to-line voltage for said pair is less than zero,
(2) an integrating means for generating a second signal representative of the integral of said first signal, and
(3) a second zero crossing detector for generating a third signal, said third signal having a first value when said second signal is greater than zero, and a second value when said second signal is less than zero, wherein said third signals correspond to said trigger signals for the capacitor switch means for the respective pairs of output lines.

13. The system according to claim 9 wherein said trigger means includes for each pair of said output lines:
(1) a first zero crossing detector means coupled to said pair of output lines for generating a first signal having a first value when the line-to-line voltage for said pair is greater than zero and a second value when the line-to-line voltage for said pair is less than zero,
(2) an integrating means for generating a second signal representative of the integral of said first signal, and
(3) a second zero crossing detector for generating a third signal, said third signal having a first value when said second signal is greater than zero, and a second value when said second signal is less than zero.

wherein said third signals correspond to said trigger signals for the capacitor switch means for the respective pairs of output lines.

14. An induction generator system comprising:

A. an n-phase induction machine having an input shaft and at least n output lines, where n is an integer, wherein each output line is coupled to an associated output terminal, B. means for generating a frequency control signal representative of the difference between the frequency of the voltage of at least one of said output terminals and a reference value, C. torque generating means responsive to said frequency control signal for applying a torque to said input shaft, said applied torque being related to said frequency control signal, D. an N-stage switched capacitor array, where N is an integer, each stage including n capacitor networks, each network being associated with a pair of said output lines, wherein the capacitor networks within each stage are each characterized by a predetermined capacitance for that stage, and wherein each of said capacitor networks includes an associated capacitor switch means, each switch means being responsive to a trigger signal for selectively coupling said capacitor network across its associated pair of output lines, E. feedback means coupled to said output lines and including trigger means for generating said trigger signals, wherein for each output line pair for each of said N stages, said capacitor network includes an inductor connected in series with a capacitor between two terminals, and said associated capacitor switch means includes:

a first semiconductor switch network coupled between said inductor and one line of said pair of output lines, said first switch network including a TRIAC device having its MT2 terminal coupled to said one output line and its MT1 terminal coupled to one terminal of said capacitor network and a diode having its cathode coupled to the gate terminal of said TRIAC device and its anode coupled to said one line, wherein one of said trigger signals is selectively coupled across the gate and MT1 terminals of said TRIAC device, and a second semiconductor switch network coupled between said capacitor and the other line of said pair of output lines, said second switch network including an SCR device having its anode terminal coupled to said other output line and its cathode coupled to the other terminal of said capacitor network, and a diode having its cathode terminal coupled to said other output line and its anode terminal coupled to the cathode terminal of said SCR device, wherein one of said trigger signals is selectively coupled across the gate and cathode terminals of said SCR device.

15. The system according to claim 14 wherein said output lines are adapted to provide relatively high convective heat transfer from said lines to the surrounding region, and wherein said SCR devices are coupled to said output lines with a relatively high heat transfer coefficient between the anode terminals of said SCR devices and said output lines, and wherein said TRIAC devices are coupled to said output lines with a relatively high heat transfer coefficient between the MT2 terminals of said TRIAC devices and said output lines.

16. The system according to claim 1 wherein for each output line pair for each of said N stages, said capacitor network includes an inductor connected in series with a capacitor between two terminals, and said associated capacitor switch means includes:

a first semiconductor switch network coupled between said inductor and one line of said pair of output lines, said first switch network including a TRIAC device having its MT2 terminal coupled to said one output line and its MT1 terminal coupled to one terminal of said capacitor network and a diode having its cathode coupled to the gate terminal of said TRIAC device and its anode coupled to said one line, wherein one of said trigger signals is selectively coupled across the gate and MT1 terminals of said TRIAC device, and a second semiconductor switch network coupled between said capacitor and the other line of said pair of output lines, said second switch network including an SCR device having its anode terminal coupled to said other output line and its cathode coupled to the other terminal of said capacitor network, and a diode having its cathode terminal coupled to said other output line and its anode terminal coupled to the cathode terminal of said SCR device, wherein one of said trigger signals is selectively coupled across the gate and cathode terminals of said SCR device.

17. The system according to claim 16 wherein said output liines are adapted to provide relatively high convective heat transfer from said lines to the surrounding region, and wherein said SCR devices are coupled to said output lines with a relatively high heat transfer coefficient between the anode terminals of said SCR devices and said output lines, and wherein said TRIAC devices are coupled to said output lines with a relatively high heat transfer coefficient between the MT2 terminals of said TRIAC devices and said output lines.

18. The system according to claims 2 or 4 or 5 wherein for each output line pair for each of said N stages, said capacitor network includes an inductor connected in series with a capacitor between two terminals, and said associated capacitor switch means includes:

a first semiconductor switch network coupled between said inductor and one line of said pair of output lines, said first switch network including a TRIAC device having its MT2 terminal coupled to said one output line and its MT1 terminal coupled to one terminal of said capacitor network and a diode having its cathode coupled to the gate terminal of said TRIAC device and its anode coupled to said one line, wherein one of said trigger signals is selectively coupled across the gate and MT1 terminals of said TRIAC device, and a second semiconductor switch network coupled between said capacitor and the other line of said pair of output lines, said second switch network including an SCR device having its anode terminal coupled to said other output line and its cathode coupled to the other terminal of said capacitor network, and a diode having its cathode terminal coupled to said other output line and its anode terminal coupled to the cathode terminal of said SCR device, wherein one of said trigger signals is selectively coupled across the gate and cathode terminals of said SCR device.

19. The system according to claim 18 wherein said output lines are adapted to provide relatively high convective heat transfer from said lines to the surrounding region, and
wherein said SCR devices are coupled to said output lines with a relatively high heat transfer coefficient between the anode terminals of said SCR devices and said output lines, and
wherein said TRIAC devices are coupled to said output lines with a relatively high heat transfer coefficient between the MT2 terminals of said TRIAC devices and said output lines.

20. The system according to claim 6 wherein for each output line pair for each of said N stages, said capacitor network includes an inductor connected in series with a capacitor between two terminals, and said associated capacitor switch means includes:
a first semiconductor switch network coupled between said inductor and one line of said pair of output lines, said first switch network including a TRIAC device having its MT2 terminal coupled to said one output line and its MT1 terminal coupled to one terminal of said capacitor network and a diode having its cathode coupled to the gate terminal of said TRIAC device and its anode coupled to said one line, wherein one of said trigger signals is selectively coupled across the gate and MT1 terminals of said TRIAC device, and a second semiconductor switch network coupled between said capacitor and the other line of said pair of output lines, said second switch network including an SCR device having its anode terminal coupled to said other output line and its cathode coupled to the other terminal of said capacitor network, and a diode having its cathode terminal coupled to said other output line and its anode terminal coupled to the cathode terminal of said SCR device, wherein one of said trigger signals is selectively coupled across the gate and cathode terminals of said SCR device.

21. The system according to claim 20 wherein said output lines are adapted to provide relatively high convective heat transfer from said lines to the surrounding region, and
wherein said SCR devices are coupled to said output lines with a relatively high heat transfer coefficient between the anode terminals of said SCR devices and said output lines, and
wherein said TRIAC devices are coupled to said output lines with a relatively high heat transfer coefficient between the MT2 terminals of said TRIAC devices and said output lines.

22. The system according to claim 11 wherein for each output line pair for each of said N stages, said capacitor network includes an inductor connected in series with a capacitor between two terminals, and said associated capacitor switch means includes:
a first semiconductor switch network coupled between said inductor and one line of said pair of output lines, said first switch network including a TRIAC device having its MT2 terminal coupled to said one output line and its MT1 terminal coupled to one terminal of said capacitor network and a diode having its cathode coupled to the gate terminal of said TRIAC device and its anode coupled to said one line, wherein one of said trigger signals is selectively coupled across the gate and MT1 terminals of said TRIAC device, and a second semiconductor switch network coupled between said capacitor and the other line of said pair of output lines, said second switch network including an SCR device having its anode terminal coupled to said other output line and its cathode coupled to the other terminal of said capacitor network, and a diode having its cathode terminal coupled to said other output line and its anode terminal coupled to the cathode terminal of said SCR device, wherein one of said trigger signals is selectively coupled across the gate and cathode terminals of said SCR device.

23. The system according to claim 22 wherein said output lines are adapted to provide relatively high convective heat transfer from said lines to the surrounding region, and
wherein said SCR devices are coupled to said output lines with a relatively high heat transfer coefficient between the anode terminals of said SCR devices and said output lines, and
wherein said TRIAC devices are coupled to said output lines with a relatively high heat transfer coefficient between the MT2 terminals of said TRIAC devices and said output lines.

24. An induction generator system comprising:
A. an n-phase induction machine having an input shaft and at least n output lines, where n is an integer, wherein each output line is coupled to an associated output terminal,
B. means for generating a frequency control signal representative of the difference between the frequency of the voltage of at least one of said output terminals and a reference value,
C. torque generating means responsive to said frequency control signal for applying a torque to said input shaft, said applied torque being related to said frequency control signal,
D. an N-stage switched capacitor array, where N is an integer, each stage including n capacitor networks, each network being associated with a pair of said output lines, wherein the capacitor networks within each stage are each characterized by a predetermined capacitance for that stage, and wherein each of said capacitor networks includes an associated capacitor switch means, each switch means being responsive to a trigger signal for selectively coupling said capacitor network across its associated pair of output lines,
E. feedback means coupled to said output lines and including trigger means for generating said trigger signals,
F. an overload capacitance network, said overload capacitance network including n branch networks, wherein each branch network includes:
  (1) an A.C. electrolytic capacitor coupled in series with a normally-conductive bi-directional switch network, said switch network being responsive to a gate signal to be non-conductive, and
  (2) means for generating said gate signal only when the voltage across said switch network is lower than a predetermined threshold.

25. The system according to claim 24 wherein said A.C. electrolytic capacitor includes a pair of oppositely polarized capacitors connected in series.

26. The system according to claim 24 wherein each of said branch networks is connected between an associated pair of said output lines.

27. The system according to claim 24 wherein each of said branch networks is connected between an associated one of said output lines and a common potential.

28. The system according to claim 24 wherein said switch network includes a pair of oppositely directed SCR's connected in parallel and a pair of trigger transformers, each SCR having the secondary coil of one of said trigger transformers connected between its gate and cathode, and wherein the primary coils of said trigger transformers are adapted to receive said gate signal between said A.C. electrolytic capacitor and said switch network.

29. A system according to claim 1, further comprising an overload capacitance network, said overload capacitance network including n branch networks, wherein each branch network includes:
(1) an A.C. electrolytic capacitor coupled in series with a normally-conductive bi-directional switch network, said switch network being responsive to a gate signal to be non-conductive, and
(2) means for generating said gate signal only when the voltage across said switch network is lower than a predetermined threshold.

30. The system according to claim 29 wherein said A.C. electrolytic capacitor includes a pair of oppositely polarized capacitors connected in series.

31. The system according to claim 29 wherein each of said branch networks is connected between an associated pair of said output lines.

32. The system according to claim 29 wherein each of said branch networks is connected between an associated one of said output lines and a common potential.

33. The system according to claim 29 wherein said switch network includes a pair of oppositely directed SCR's connected in parallel and a pair of trigger transformers, each SCR having the secondary coil of one of said trigger transformers connected between its gate and cathode, and wherein the primary coils of said trigger transformers are adapted to receive said gate signal between said A.C. electrolytic capacitor and said switch network.

34. A system according to claim 2, further comprising an overload capacitance network, said overload capacitance network including n branch networks, wherein each branch network includes:
(1) an A.C. electrolytic capacitor coupled in series with a normally-conductive bi-directional switch network, said switch network being responsive to a gate signal to be non-conductive, and
(2) means for generating said gate signal only when the voltage across said switch network is lower than a predetermined threshold.

35. The system according to claim 34 wherein said A.C. electrolytic capacitor includes a pair of oppositely polarized capacitors connected in series.

36. The system according to claim 34 wherein each of said branch networks is connected between an associated pair of said output lines.

37. The system according to claim 34 wherein each of said branch networks is connected between an associated one of said output lines and a common potential.

38. The system according to claim 34 wherein said switch network includes a pair of oppositely directed SCR's connected in parallel and a pair of trigger transformers, each SCR having the secondary coil of one of said trigger transformers connected between its gate and cathode, and wherein the primary coils of said trigger transformers are adapted to receive said gate signal between said A.C. electrolytic capacitor and said switch network.

39. A system according to claim 6, further comprising an overload capacitance network, said overload capacitance network including n branch networks, wherein each branch network includes:
(1) an A.C. electrolytic capacitor coupled in series with a normally-conductive bi-directional switch network, said switch network being responsive to a gate signal to be non-conductive, and
(2) means for generating said gate signal only when the voltage across said switch network is lower than a predetermined threshold.

40. The system according to claim 39 wherein said A.C. electrolytic capacitor includes a pair of oppositely polarized capacitors connected in series.

41. The system according to claim 39 wherein each of said branch networks is connected between an associated pair of said output lines.

42. The system according to claim 39 wherein each of said branch networks is connected between an associated one of said output lines and a common potential.

43. The system according to claim 39 wherein said switch network includes a pair of oppositely directed SCR's connected in parallel and a pair of trigger transformers, each SCR having the secondary coil of one of said trigger transformers connected between its gate and cathode, and wherein the primary coils of said trigger transformers are adapted to receive said gate signal between said A.C. electrolytic capacitor and said switch network.

44. A system according to claim 11, further comprising an overload capacitance network, said overload capacitance network including n branch networks, wherein each branch network includes:
(1) an A.C. electrolytic capacitor coupled in series with a normally-conductive bi-directional switch network, said switch network being responsive to a gate signal to be non-conductive, and
(2) means for generating said gate signal only when the voltage across said switch network is lower than a predetermined threshold.

45. The system according to claim 44 wherein said A.C. electrolytic capacitor includes a pair of oppositely polarized capacitors connected in series.

46. The system according to claim 44 wherein each of said branch networks is connected between an associated pair of said output lines.

47. The system according to claim 44 wherein each of said branch networks is connected between an associated one of said output lines and a common potential.

48. The system according to claim 44 wherein said switch network includes a pair of oppositely directed SCR's connected in parallel and a pair of trigger transformers, each SCR having the secondary coil of one of said trigger transformers connected between its gate and cathode, and wherein the primary coils of said trigger transformers are adapted to receive said gate signal between said A.C. electrolytic capacitor and said switch network.

49. A system according to claim 14, further comprising an overload capacitance network, said overload capacitance network including n branch networks, wherein each branch network includes:

(1) an A.C. electrolytic capacitor coupled in series with a normally-conductive bi-directional switch network, said switch network being responsive to a gate signal to be non-conductive, and (2) means for generating said gate signal only when the voltage across said switch network is lower than a predetermined threshold.

50. The system according to claim 49 wherein said A.C. electrolytic capacitor includes a pair of oppositely polarized capacitors connected in series.

51. The system according to claim 49 wherein each of said branch networks is connected between an associated pair of said output lines.

52. The system according to claim 49 wherein each of said branch networks is connected between an associated one of said output lines and a common potential.

53. The system according to claim 49 wherein said switch network includes a pair of oppositely directed SCR's connected in parallel and a pair of trigger transformers, each SCR having the secondary coil of one of said trigger transformers connected between its gate and cathode, and wherein the primary coils of said trigger transformers are adapted to receive said gate signal between said A.C. electrolytic capacitor and said switch network.

54. The system according to claim 2 wherein said power factor signal is proportional to the reactive power at said output terminals.

55. The system according to claim 2 wherein said power factor signal is proportional to the power factor at said output terminals.

56. An induction generator system comprising:
A. an n-phase induction machine having an input shaft and at least n output lines, where n is an integer, wherein each output line is coupled to an associated output terminal,
B. means for generating a frequency control signal representative of the difference between the frequency of the voltage of at least one of said output terminals and a reference value,
C. torque generating means responsive to said frequency control signal for applying a torque to said input shaft, said applied torque being related to said frequency control signal,
D. an N-stage switched capacitor array, where N is an integer, each stage including n capacitor networks, each network being associated with a pair of said output lines, wherein the capacitor networks within each stage are each characterized by a predetermined capacitance for that stage, and wherein each of said capacitor networks includes an associated capacitor switch means, each switch means being responsive to a trigger signal for selectively coupling said capacitor network across its associated pair of output lines,
E. feedback means coupled to said output lines and including trigger means for generating said trigger signals, wherein said feedback means includes power factor detection means for generating power factor signals representative of the power factors at the respective ones of said output terminals, and wherein said feedback means includes means for coupling the output terminals of said induction machine to the power lines of an external power grid, said external power grid having a predetermined nominal frequency and voltage on said power lines, and said feedback means further includes means for coupling said power factor signals to said trigger means whereby said induction generator system delivers substantially only real power to said external power grid.

57. The system according to claim 56 wherein said power factor signal is proportional to the reactive power at said output terminals.

58. The system according to claim 56 wherein said power factor signal is proportional to the power factor at said output terminals.

* * * * *